United States Patent [19]
Hoffman et al.

[11] Patent Number: 5,453,939
[45] Date of Patent: Sep. 26, 1995

[54] COMPUTERIZED DIAGNOSTIC AND MONITORING SYSTEM

[75] Inventors: John P. Hoffman, Peoria; Ricky D. Vance, Washington; Dennis A. Barney, Morton; Joseph G. Kozlevcar, Peoria, all of Ill.

[73] Assignee: Caterpillar Inc., Peoria, Ill.

[21] Appl. No.: 945,451

[22] Filed: Sep. 16, 1992

[51] Int. Cl.$^6$ .............................. G06F 11/00; B60Q 1/00
[52] U.S. Cl. .............................. 364/551.01; 364/424.03; 73/117.2; 340/438; 340/439; 340/461
[58] Field of Search .................. 364/551.01, 424.01, 364/424.03, 424.04; 73/116, 117.2, 117.3; 340/438, 439, 461, 945, 959

[56] References Cited

U.S. PATENT DOCUMENTS

| | | | |
|---|---|---|---|
| 3,509,529 | 4/1970 | Utter | 340/52 |
| 3,516,063 | 6/1970 | Arkin et al. | 340/163 |
| 3,866,166 | 2/1975 | Kerscher, III et al. | 340/52 |
| 3,893,108 | 7/1975 | McBride, Jr. et al. | 340/420 |
| 3,906,437 | 9/1975 | Brandwein et al. | 340/27 |
| 4,053,868 | 10/1977 | Cox et al. | 340/52 |
| 4,072,925 | 2/1978 | Yashima et al. | 340/52 |
| 4,128,005 | 12/1978 | Arnston et al. | 73/117.3 |
| 4,197,650 | 4/1980 | Bailey et al. | 33/143 |
| 4,223,302 | 9/1980 | Hocking | 340/525 |
| 4,271,402 | 6/1981 | Kastura et al. | 340/52 |
| 4,287,504 | 9/1981 | Simon et al. | 340/52 |
| 4,376,298 | 3/1983 | Sokol et al. | 364/551 |
| 4,442,424 | 4/1984 | Shirasaki et al. | 340/52 |
| 4,497,057 | 1/1985 | Kato et al. | 371/29 |
| 4,521,885 | 6/1985 | Melocik et al. | 371/29 |
| 4,551,801 | 11/1985 | Sokol | 364/424 |
| 4,583,176 | 4/1986 | Yamato et al. | 364/431.11 |

(List continued on next page.)

FOREIGN PATENT DOCUMENTS

| | | |
|---|---|---|
| 3837592A1 | 5/1990 | Germany. |
| 60-107109 | of 1985 | Japan. |
| WO89/12279 | 12/1989 | WIPO. |
| WO92/04693 | 3/1992 | WIPO. |

OTHER PUBLICATIONS

Caterpillar Service Manual — "Computerized Monitoring System With LCD Bargraph Gauges", published in 1991.
Journal Article — "Microelectronics takes to the road in a big way: a special report", pp. 113–122 in the Nov. 20, 1980 edition of Electronics.
Journal Article — "Expert–systems applied to earth–moving vehicle transmission troubleshooting", pp. 38–40, published in the Dec., 1990 edition of Automotive Engineer.
Publication entitled "Introducing the Vital Signs Monitor plus Load Weighing System", by Marathon LeTrouneau, published on or about 1988.
Journal Article — "all on board with O & K" belived to have been published on or about Jan., 1990, and sales literature attached thereto.
Article from Ropec Industries, Inc., re "Micrologue, tm Model SW100, which is a Vehicle Management System".

*Primary Examiner*—Emanuel T. Voeltz
*Assistant Examiner*—M. Kemper
*Attorney, Agent, or Firm*—Thomas J. Bluth; Steven R. Janda

[57] ABSTRACT

Systems for monitoring sensed parameters and diagnosing fault conditions are useful in many applications. Advantageously, such systems are capable of operating in a plurality of operating modes and in connection with each of a plurality of machines. In the subject invention, a plurality of gauges are included for indicating the levels of the sensed parameters. A plurality of symbols are included for identifying sensed parameters. A control receives an identification code and selectively illuminates one or more of a plurality of gauges and symbols in response to the identification code. A plurality of warning lights are each associated with a switch-type input. A display selectively indicates a pin code for each switch-type input having a fault condition. The indicator lights having an associated switch-type input in the fault condition are flashed. A device selectively indicates a pin code in response to each diagnosable input having a present or a previous fault condition.

2 Claims, 17 Drawing Sheets

U.S. PATENT DOCUMENTS

| | | | |
|---|---|---|---|
| 4,667,176 | 5/1987 | Matsuda | 340/52 |
| 4,694,408 | 9/1987 | Zaleski | 364/551 |
| 4,748,843 | 6/1988 | Schafer et al. | 73/117.3 |
| 4,809,177 | 2/1989 | Windle et al. | 364/424.01 |
| 4,811,240 | 3/1989 | Ballou et al. | 364/424.01 X |
| 4,812,744 | 3/1989 | Havel | 324/115 |
| 4,815,824 | 3/1989 | Sharples | 350/336 |
| 4,843,557 | 6/1989 | Ina et al. | 364/431.77 |
| 4,862,395 | 8/1989 | Fey et al. | 364/561 |
| 4,896,276 | 1/1990 | Saglimbeni et al. | 364/550 |
| 4,926,331 | 5/1990 | Windle et al. | 364/424.04 |
| 4,939,652 | 7/1990 | Steiner | 364/424.04 |
| 4,967,143 | 10/1990 | Raviglione et al. | 324/73.1 |
| 4,975,848 | 12/1990 | Abe et al. | 364/424.03 |
| 4,977,389 | 12/1990 | Shiraishi | 340/461 |
| 5,019,799 | 5/1991 | Oshiage et al. | 340/438 |
| 5,034,889 | 7/1991 | Abe | 364/424.04 |
| 5,041,980 | 8/1991 | Maddock et al. | 364/431.03 |
| 5,050,080 | 9/1991 | Abe | 364/424.04 |
| 5,091,858 | 2/1992 | Paielli | 364/431.12 |
| 5,150,609 | 9/1992 | Ebner et al. | 73/117.3 |
| 5,157,610 | 10/1992 | Asano et al. | 364/424.03 |
| 5,214,582 | 5/1993 | Gray | 364/424.03 |
| 5,257,190 | 10/1993 | Crane | 364/424.03 |
| 5,313,388 | 5/1994 | Cortis | 364/424.04 |
| 5,327,344 | 7/1994 | Hoffman et al. | 364/424.03 |

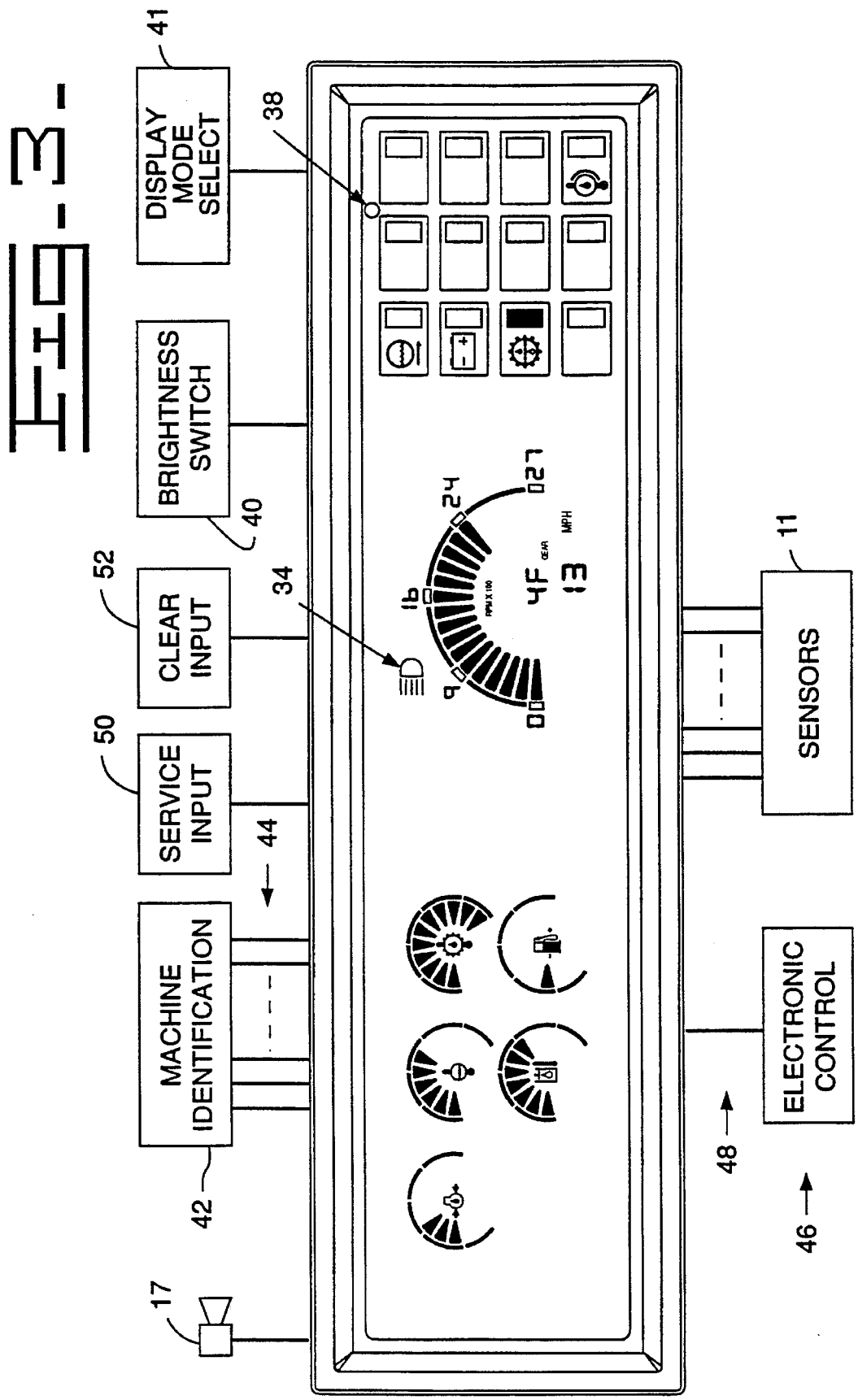

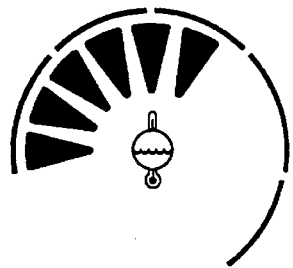
Fig_4a_
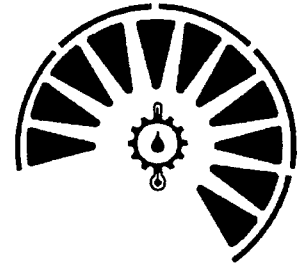
Fig_4b_
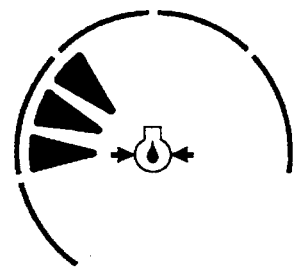
Fig_4c_
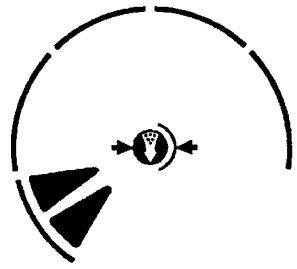
Fig_4d_
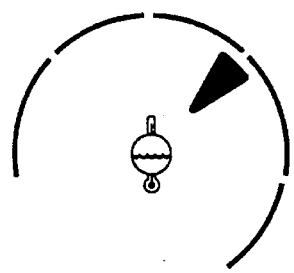
Fig_4e_

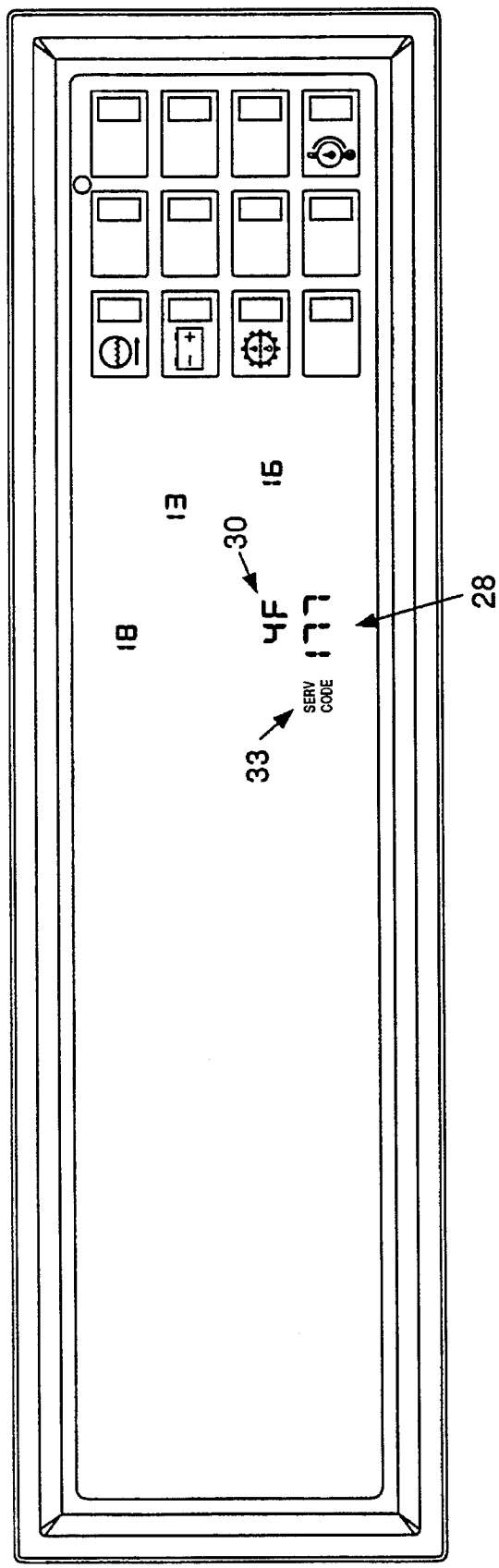

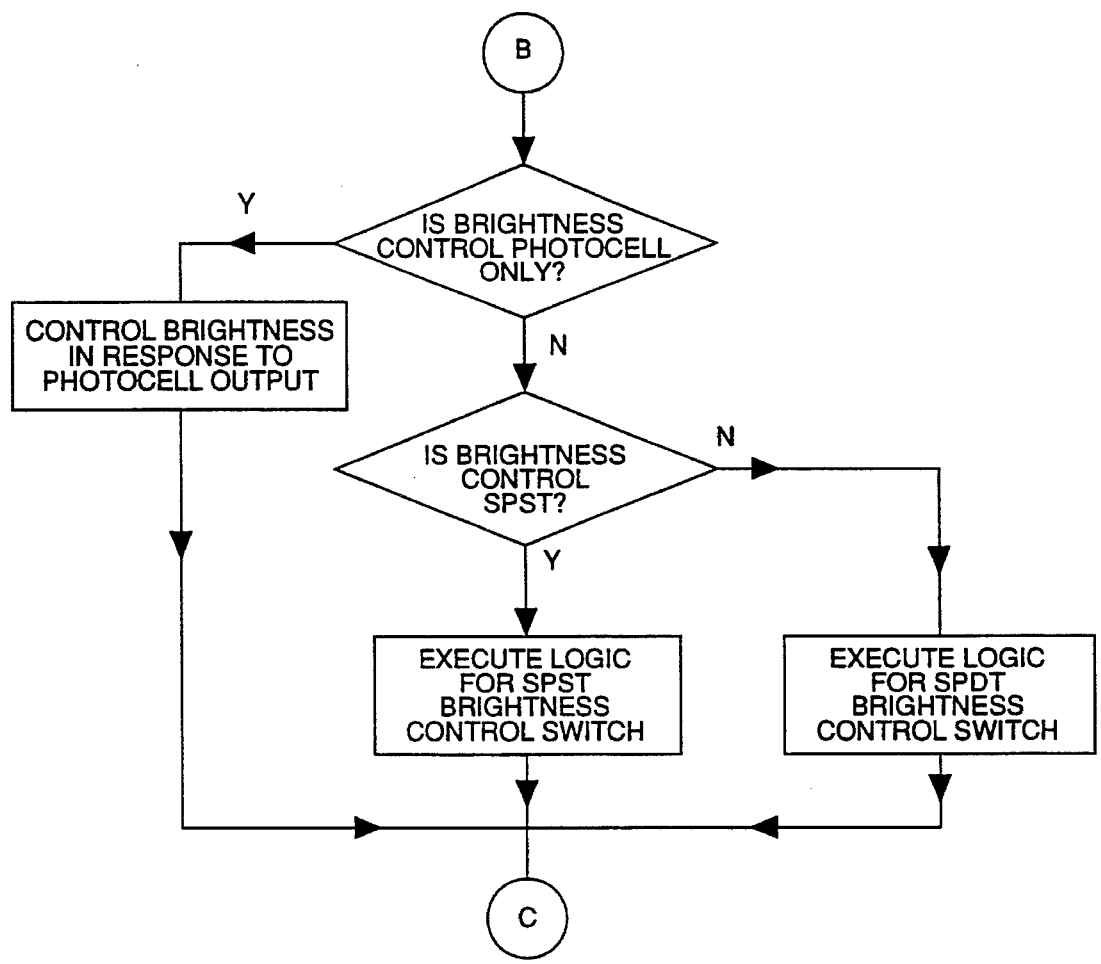

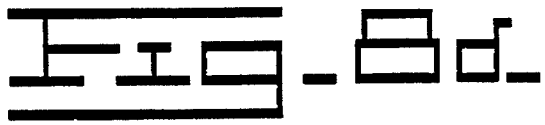
Fig_8d_
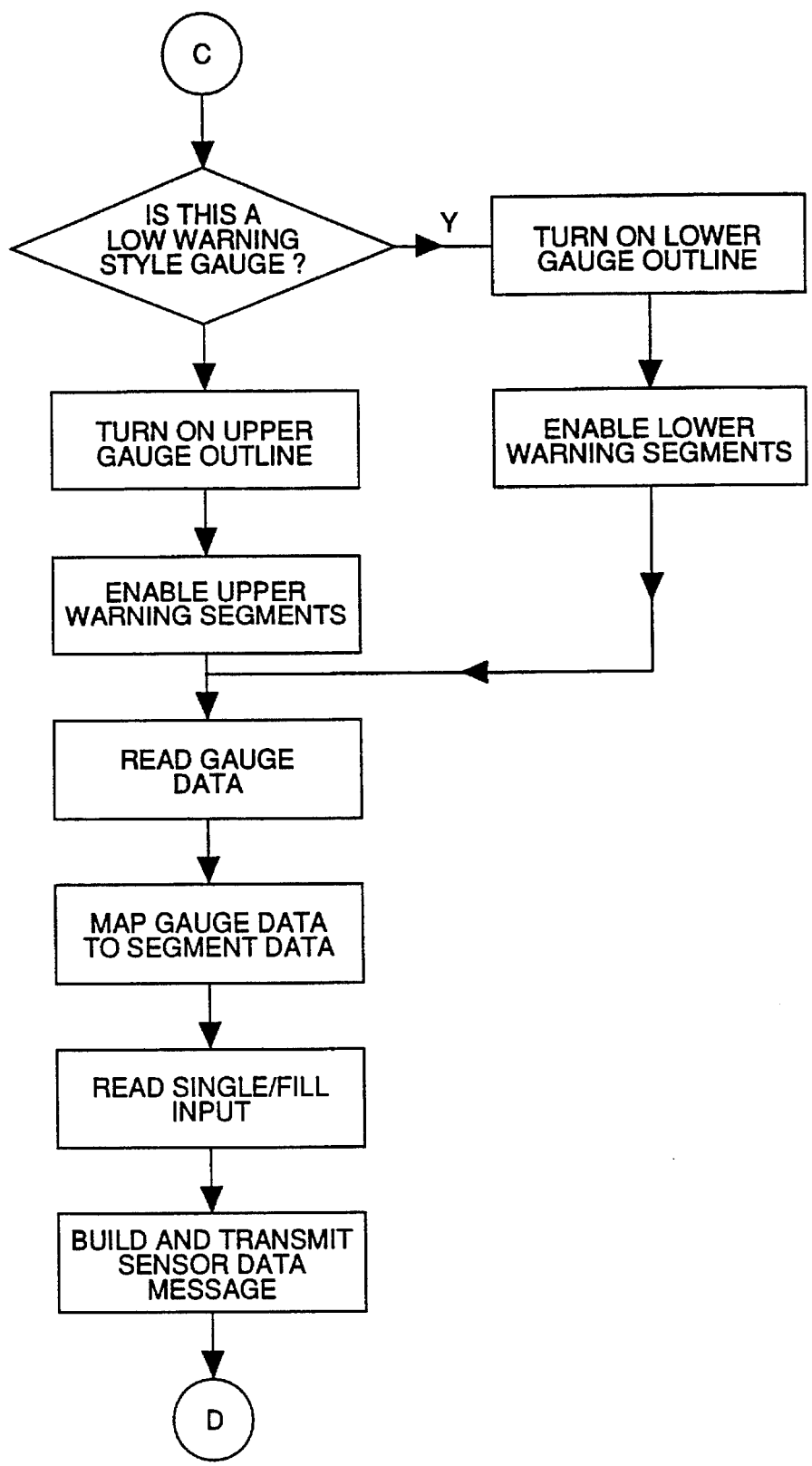

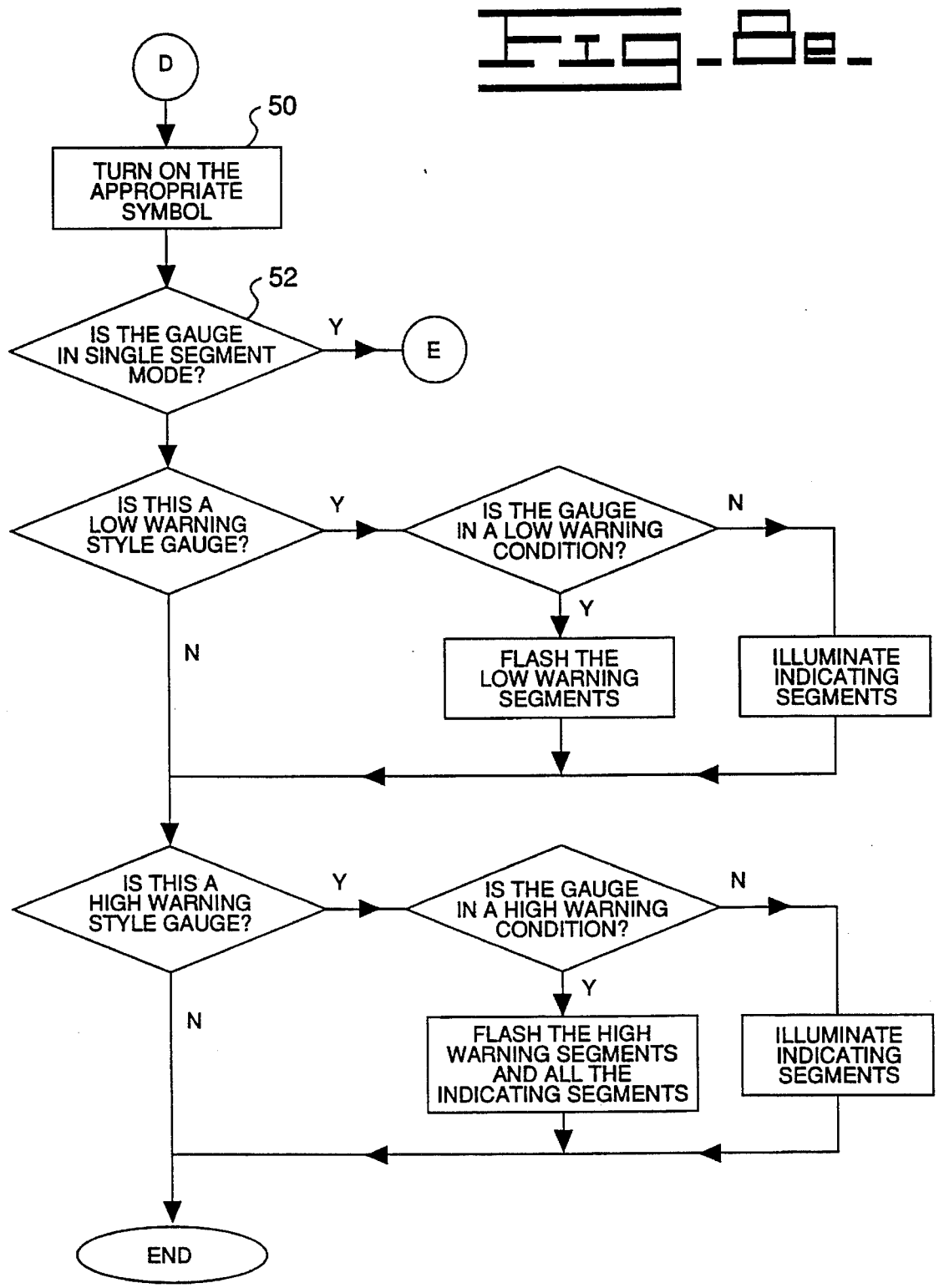
Fig-8e-

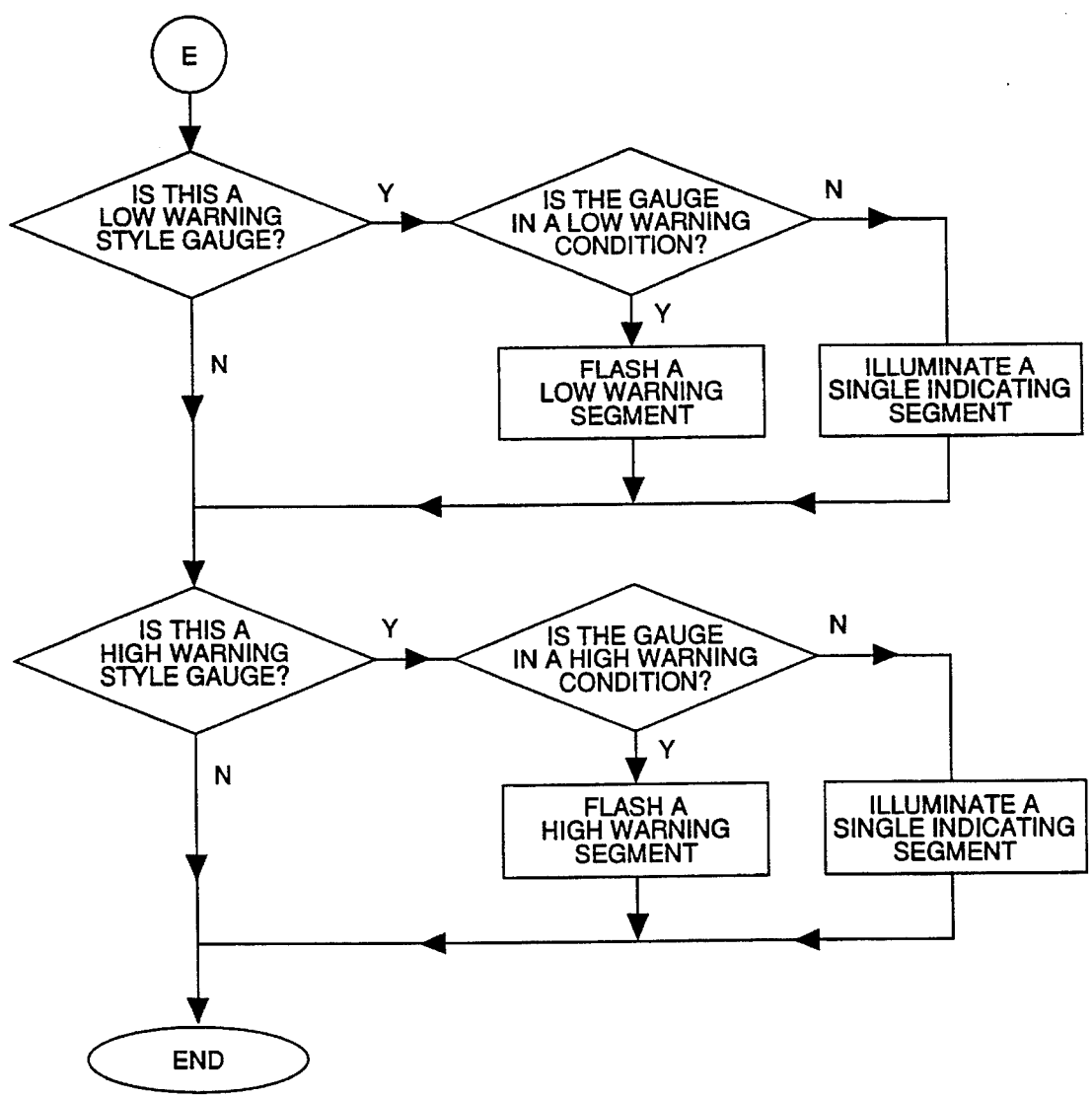

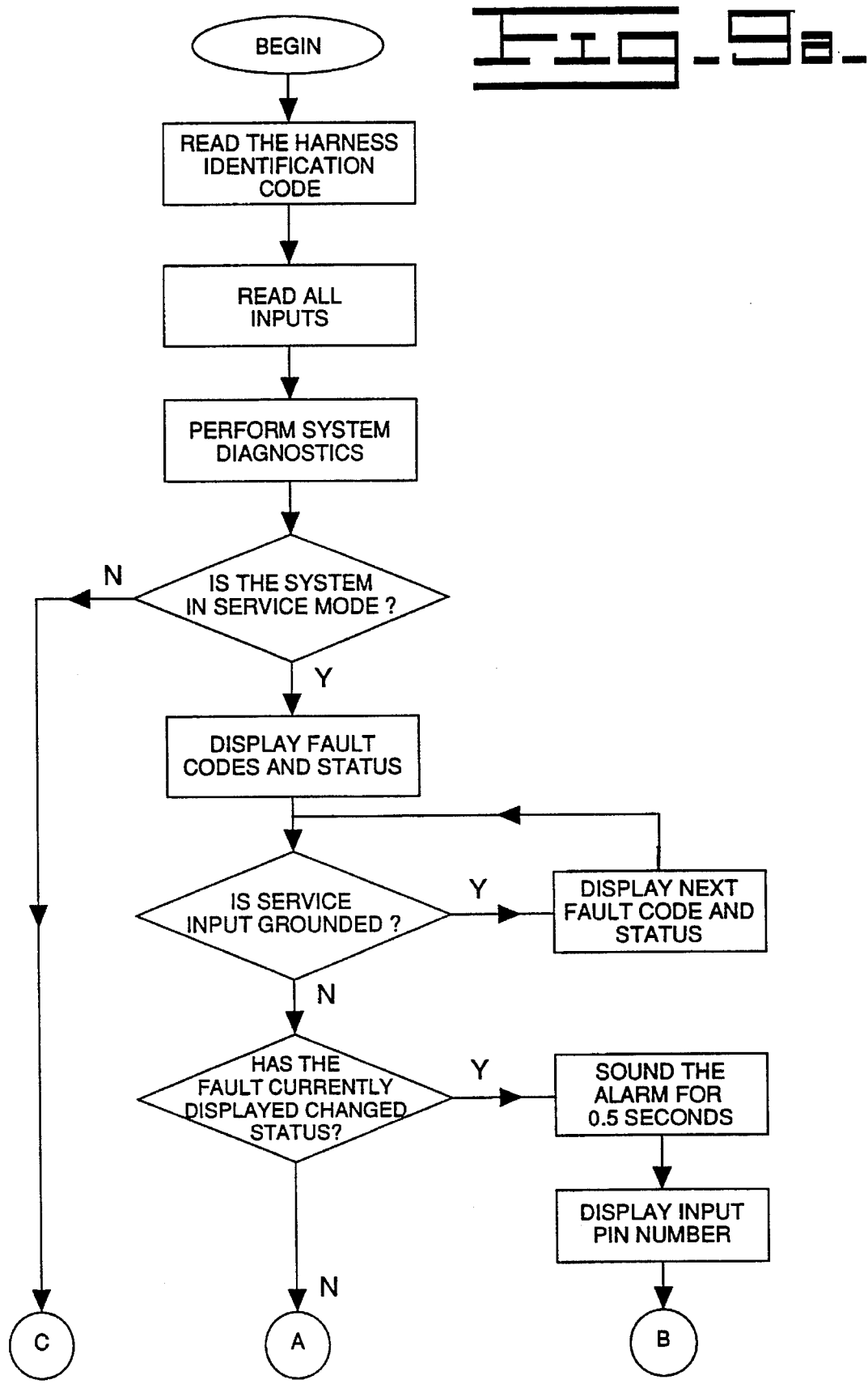

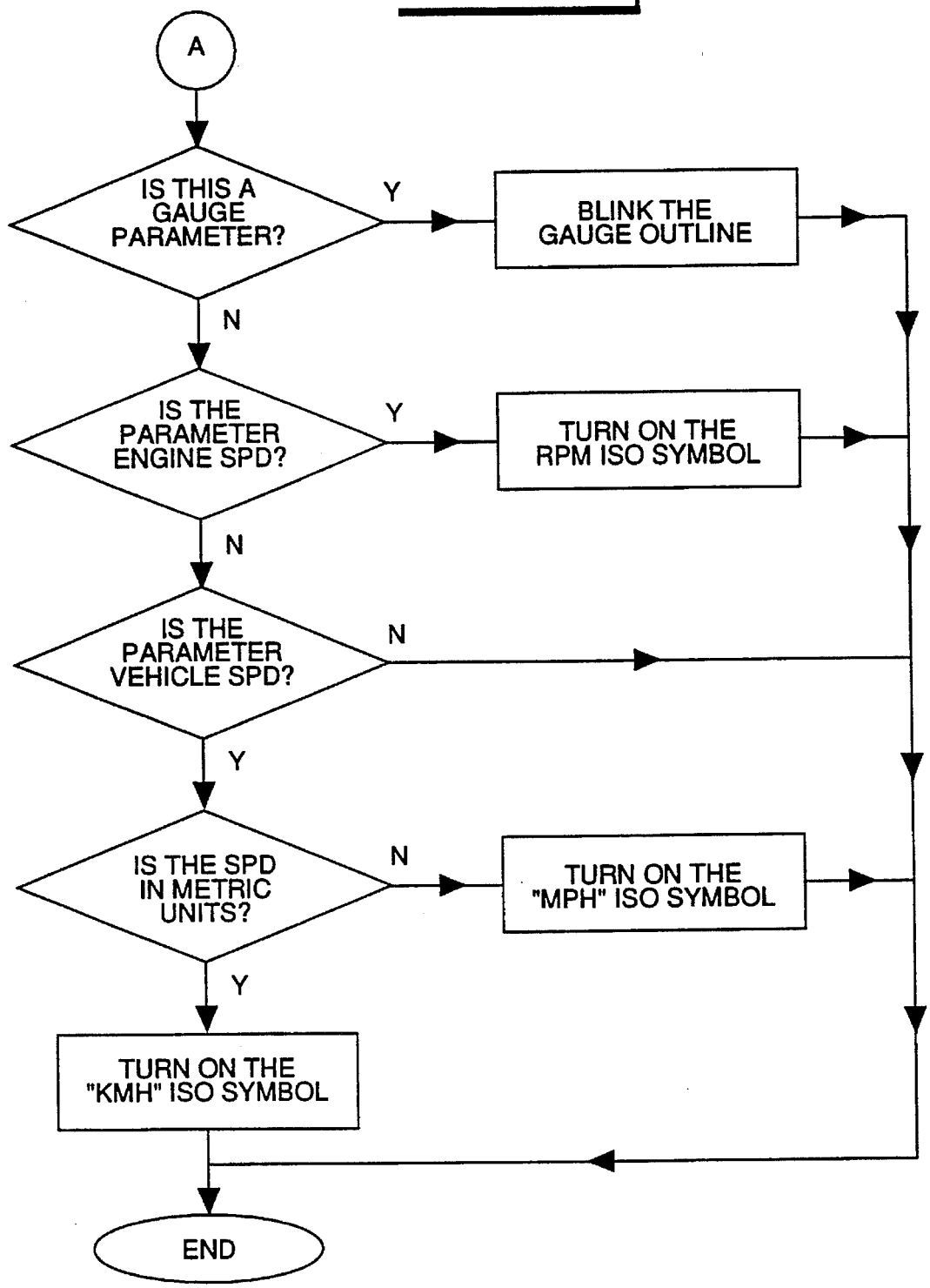
Fig_10b_

COMPUTERIZED DIAGNOSTIC AND MONITORING SYSTEM

TECHNICAL FIELD

The invention relates generally to a computerized monitoring and diagnostic system, and more particularly, to a monitoring and diagnostic system having a plurality of operating modes.

BACKGROUND ART

In a variety of engine-powered vehicles, monitoring and diagnostic devices are employed to detect the presence of various undesirable operating conditions, such as overheating of the engine, low oil pressure, low fuel, and the like, and indicators are provided to warn the operator of such conditions. These instruments are typically connected to various sensors and switches for monitoring or controlling conditions on the vehicle via a wire harness and/or a communication link. In many applications, these instruments are also connected to electronic control systems, for example electronic engine controls, electronic transmission controls, and the like.

Most prior art systems have included dedicated instruments in which the functions and conditions of the vehicle to be monitored or diagnosed, as well as the particular sensors provided on the vehicle, are identified in advance. Therefore, the instruments are specifically designed for and hence "dedicated" to the monitoring or diagnosing of those particular vehicle functions and conditions in response to signals from pre-identified sensors. Accordingly, such "dedicated" instruments generally cannot be readily modified to accommodate different machines, different sensors and/or different conditions and functions. Rather, such instruments are generally limited to use with a particular vehicle type or model for which the instrument has been designed.

However, it is advantageous for these instruments to be usable in connection with many different machines. Lower costs are achieved and less warehousing space is required if a single instrument can be manufactured which can be used in many different applications. Similarly, service time is reduced if software changes are avoided when an instrument is moved from one machine to another.

Some prior art systems have provided for standardized monitoring systems that are usable in connection with a variety of machines, for example the system shown in U.S. Pat. No. 4,551,801 issued to Sokol on Nov. 5, 1985. While being an improvement over dedicated systems, this monitoring system is still relatively inflexible and requires the addition or subtraction of monitoring modules and the use of decals to indicate the parameters being shown by each display module.

One area of desired flexibility is for each gauge in the instrument to be capable of indicating parameters having a high warning level, for example engine temperature, and also parameters having a low warning level, for example brake fluid pressure. Prior art systems required the use of decals to indicate that the gauge was indicating the level of a parameter having either a high or low warning level and/or the use of a separate warning light to show that the parameter was outside the normal operating range.

To maximize system flexibility, it is advantageous for the instrument to be capable of performing a number of diagnostic functions in addition to displaying parameter values and indicating warning conditions. Today's machines, and particularly large off-highway work vehicles, are becoming increasingly complex in their design thus making it more and more difficult for service personnel to locate defects in machine sensors and systems. This is particularly true of intermittent defects not resulting in a breakdown of a system or the vehicle but which interfere with its operation.

A major frustration when troubleshooting electrical problems on a large work vehicle is caused by intermittent problems. Typically, the operator reports some symptom to a technician and before the technician can get to the machine the problem is no longer present.

If the condition is not present it is helpful for the technician to re-create the fault condition. In many cases the fault condition is caused by a short to ground potential or an open circuit. To recreate these fault conditions, the technician manipulates the wire harnesses or wire connectors to determine the point at which the fault has occurred.

Prior art systems have indicated when fault conditions are present. In connection with such systems, the technician must view a visual display to determine whether the condition is present. In troubleshooting intermittent problems when the fault condition is not currently present, the technician must manipulate wire harnesses and connectors to recreate the fault and thus cause the fault indication to be displayed. When the fault condition is present, the technician must manipulate wire harnesses and connectors and observe whether the manipulations eliminate the fault and thus cause the fault indication to disappear.

In many cases, however, the machine is of sufficient size that the technician must leave the area of the diagnostic tool to recreate the fault condition. Therefore, any visual indicator provided by the diagnostic tool is not visible to the technician. To effectively troubleshoot the electrical system on such a large machine, typically two or more technicians are required and repair expenses are thus greatly increased. Similarly, the vehicle may not be repairable immediately if only a single technician is available.

In addition, these machines typically include switch-type inputs that are either in an open voltage or grounded condition. One of the voltage conditions is defined as a fault condition. In most cases, the fault condition is defined as the open voltage condition thus whenever the wire between the sensor and the display is severed or disconnected, a fault condition is indicated. Similarly, if the switch-type input is connected to a switch-type sensor, the switch-type sensor disconnects the sensor output from ground potential when the sensed parameter exceeds a warning level.

Some prior art systems have illuminated a warning light for each switch-type sensor that is in a fault condition. Each warning light is associated with one of the switch-type sensors and is illuminated when the display input associated with that switch-type sensor is indicating a fault condition. While adequate for many purposes, in other cases it is advantageous to also indicate the pin number of the input associated with the switch-type sensor. Optimally, the technician should be able to determine the pin number of each of the warning lights indicating a fault condition even though there are more than one of such warning lights. This would allow technicians to more readily identify the fault condition and associate the sensor having the fault condition to the relevant connector pin.

While troubleshooting some diagnosable sensor problems, it is sometimes difficult to determine whether a sensor is producing a signal that is truly representative of the actual level of the sensed parameter. This often results in technicians spending time replacing sensors that actually are producing accurate signals which tends to increase the time required, and thus the cost, for repairs.

It is therefore advantageous to determine whether the sensor is producing an accurate signal without replacing the sensor. Since gauges included in the standard operator display do not provide a sufficiently precise readout of the sensed parameter for this purpose, one method of determining the output would be to display the parameter level being reported by the sensor on a digital display and comparing the displayed level to a measurement reported by a test sensor. For example, if the technician is interested in checking the engine coolant temperature sensor, the technician obtains a reference to which to compare the sensor by measuring coolant temperature with a service tool. By comparing the temperatures reported by the vehicle-mounted sensor and the service tool, the technician can determine whether the vehicle-mounted sensor has failed without spending time replacing the sensor.

The present invention is directed to overcoming one or more of the problems set forth above.

DISCLOSURE OF THE INVENTION

The subject invention avoids the disadvantages of known diagnostic and monitoring systems and provides a flexible system capable of operating in a plurality of operating modes for displaying the level of sensed parameters and indicating warning conditions and fault conditions. The instrument is sufficiently flexible to be used in connection with each of a plurality of machine types.

In one aspect of the invention, an apparatus is provided for indicating levels of sensed parameters, warning conditions, and fault conditions on a machine having an instrument panel. The machine also includes a plurality of switch-type inputs and diagnosable inputs which each indicate one of a normal state and fault condition. A plurality of gauges are included for indicating the levels of the sensed parameters. A plurality of symbols are included for identifying the sensed parameters. A control receives an identification code and selectively illuminates one or more of the plurality of gauges and symbols in response to the identification code. A plurality of warning lights are each associated with one of the switch-type inputs. A display selectively indicates a pin code for each switch-type input having a fault condition. The indicator lights having an associated switch-type input in the fault condition are flashed. A plurality of diagnosable sensors produce a plurality of diagnosable sensor signals. A device selectively indicates a pin code in response to each of the diagnosable inputs having a present or a previous fault condition.

In another aspect of the invention, a method is provided for indicating levels of sensed parameters, warning conditions, and fault conditions on a machine having an instrument panel and a plurality of switch-type inputs and diagnosable inputs, the sensed parameters having normal operating ranges. The method includes the steps of indicating a level of the sensed parameters on a plurality of gauges; identifying the sensed parameter being indicated on each of the gauges; receiving an identification code and selectively illuminating one or more of the plurality of gauges in response to the identification code; selectively indicating a pin code for each switch-type input having a warning condition; flashing each indicator light having an associated switch-type input in a fault condition; sensing parameters and responsively producing sensor signals indicating one of a fault condition and a normal condition; and indicating a pin code in response to each of the diagnosable inputs having a present or a previous fault condition.

The invention also includes other features and advantages which will become apparent from a more detailed study of the drawings, specification, and appended claims.

BRIEF DESCRIPTION OF THE DRAWINGS

For a better understanding of the present invention, reference may be made to the accompanying drawings in which.

FIG. 3 illustration of a computerized diagnostic and monitoring system functioning in the normal display mode and having a plurality of inputs and the bezel and optical filter shown in FIG. 2;

FIG. 4a and 4b illustrate gauges indicating the level of parameters having a high warning value in the fill-the-graph mode;

FIG. 4c and 4d illustrate gauges indicating the level of parameters having a low warning level in the fill-the-graph;

FIG. 4e illustrates a gauge indicating the level of a parameter having a high warning level in the single-bar mode;

FIG. 5 illustrates the computerized monitoring and diagnostic system functioning in a service mode;

FIGS 8a through 8f illustrate a flow chart of an algorithm used in connection with a preferred embodiment of the invention functioning primarily in the normal display mode;

FIGS. 9a and 9b illustrate a flow chart of an algorithm diagraming operation of the instrument while in the serviced and status modes.

BEST MODE FOR CARRYING OUT THE INVENTION

Figure 1:
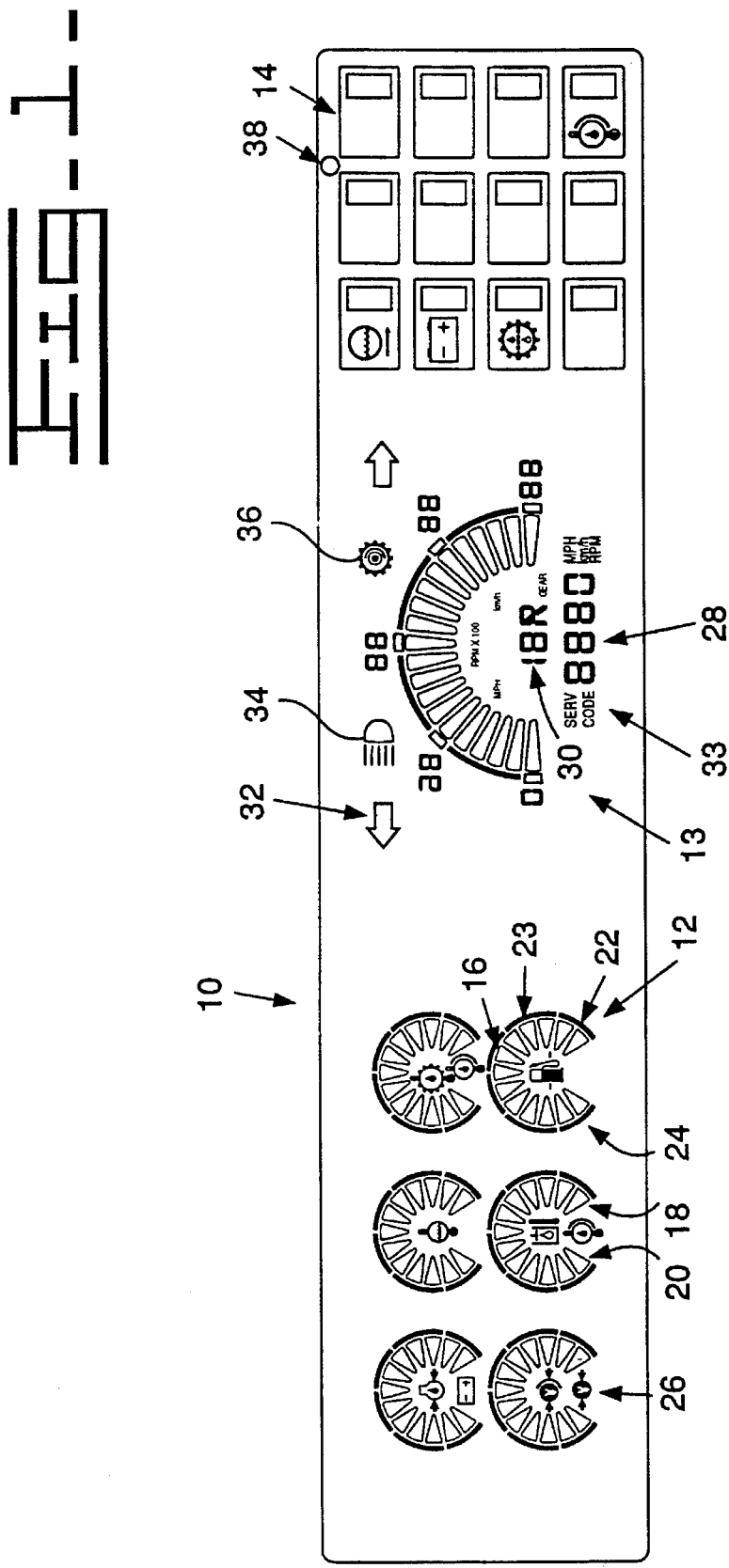
FIG. 1 illustrates a computerized monitoring and diagnostic system.

An instrument for displaying parameter values is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists. The instrument 10 is advantageously microprocessor based and functions in response to internal software. The instrument 10 includes a plurality of indicator lights 14, preferably LEDs, and a plurality of electronic gauges 12 having a plurality of illuminable segments, preferably of the vacuum fluorescent (VF) type.

The instrument 10 is connected to each of a plurality of sensors 11 by a wire harness. The instrument 10 preferably performs some processing of signals received from the sensors over the wire harness and scales the signals received from pulse-width modulated type sensors and frequency based sensors in manners well-known in the art. Similarly, the instrument 10 receives signals from switch-type inputs. The signals associated with these inputs are received by the instrument 10, but generally no scaling is required.

VF displays provide a visually attractive appearance; however, ambient light often causes VF display segments to appear to be illuminated even though the control to which the display is connected is not producing an electrical signal to illuminate the display segments. Thus, the display is difficult to read since there is very little contrast between segments that are illuminated by the control and those segments that appear to be illuminated due to ambient light.

Figure 2:
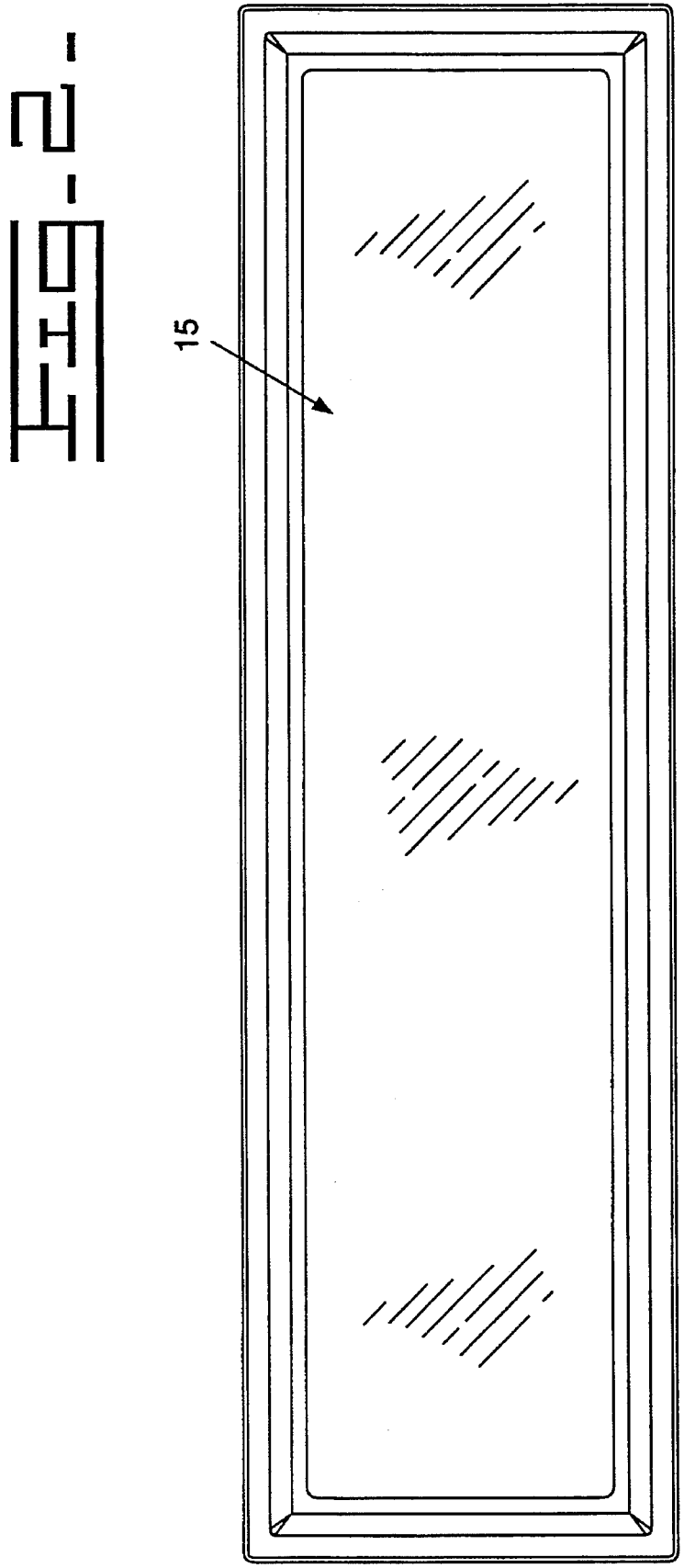
FIG 2 is an illustration of a bezel and optical filter.

To improve contrast, an optical filter 15, shown in FIG. 2, must be provided to reduce the amount of ambient light reaching the VF display segments. Advantageously, the optical filter 15 is mounted in a bezel for mounting on the front of the instrument 10 over the VF display segments so that any ambient light must pass through the optical filter 15 before reaching the display segments and any light produced by illuminating the display segments must also pass through the optical filter 15. The optical filter 15 also advantageously includes anti-glare characteristics to improve readability for the operator.

Since ambient light is filtered as it enters the instrument 10 and any reflected light is also filtered, contrast is greatly improved. In the preferred embodiment, only the display segments that are illuminated by the instrument 10 are substantially visible to the operator.

The VF display segments are available in various different colors, for example blue, green, blue-green, yellow, and red. However, each of the colors are not of the same brightness when illuminated by the instrument 10. It is therefore advantageous to select the optical filter 15 such that each of the colors appear to be of approximately the same brightness to the operator, or alternatively for the warning colors to be somewhat brighter than the other segments. For example, since the blue-green display segments are typically brighter than the red and yellow display segments, the optical filter 15 preferably allows more energy in the yellow or red portion of the electromagnetic spectrum to pass through the filter than energy in the blue-green portion of the electromagnetic spectrum. In the preferred embodiment, the optical filter passes approximately 5% of the energy in the blue-green portion of the electromagnetic spectrum, approximately 7.5% of the energy in the yellow portion of the electromagnetic spectrum, and approximately 16 percent of the energy in the red portion of the electromagnetic spectrum. It should be understood, however, that the invention is in no way limited to these particular values and other transmissivity levels may be used in connection with the invention.

Advantageously, each machine type has an identification code to be delivered to the instrument 10 which responsively reconfigures itself in response to the layout chosen by the designer for that machine. In response to the identification code, the instrument determines the parameter monitored at each input from the wire harness, the functional indicators to be illuminated, the type of display brightness control to be used, the parameter that is displayed on each gauge, the status report level for each input, the gauges to be used, the data to be transmitted over the communication link to another electronic control, the signal filtering, debounce, scaling, or averaging characteristics associated with each input, and the functional relationship between each parameter value and the gauge reading. One of the symbols 26 is illuminated for each gauge 12 in response to the identification code. Likewise, the switch-type input associated with each indicator light 14 is defined for each machine type on which the instrument 10 is used in response to the identification code.

An identification means 42 produces the identification code and a display mode select means 41 produces a display mode identifier. In the preferred embodiment, the identification means 42 and display mode select means 41 are connected to the instrument 10 via one or more identification lines 44 forming part of the wire harness and carrying the identification code and the display mode identifier.

In the preferred embodiment, the identification code and display mode identifier are in the form of binary signals that are produced by connecting each of the identification lines 44 to a ground input potential or allowing the voltage of the identification line to float in response to any voltage to which the identification line 44 is connected. In the preferred embodiment, the identification means 42 and display mode select means 41 directly connect the identification lines 44 to a terminal having one of the above described voltage characteristics; however, it should be appreciated that the identification lines 44 could be connected to a switch-type device for connection to a ground input potential or a floating terminal. While the preferred embodiment of the invention is described in connection with a ground input potential and a floating condition, it should be appreciated that the particular states of the binary signals could be modified without deviating from the spirit of the invention.

In general, the machine dependent functions and displays are determined in response to the identification code, although other inputs may be used to determine such things as whether speed will be displayed in MPH or km/h. Typically, the instrument 10 retrieves a number of identifiers from a memory device (not shown) within the instrument 10 in response to receiving the identification code. The instrument 10 then uses the identifiers to determine which functions and displays are to be used in connection with machines having the received identification code.

In the preferred embodiment, the instrument 10 includes a plurality of operating modes for use in normal operation and as a diagnostic tool. The operating modes preferably include a normal display mode, a service mode, a status mode, a tattletale mode, and a numeric display mode.

The instrument 10 preferably includes terminals for receiving signals from a clear input 52 and a service input 50. A service tool is advantageously included having two single-pole, single-throw (SPST) switches corresponding to the clear input 52 and service input 50. The technician actuates the switches to selectively ground the clear input 52 and service input 50. The service and clear inputs 50,52 are advantageously used by the technician to select the mode of operation for the instrument 10 and to provide commands to the instrument 10 when operating in one or more of the modes of operation. It should be understood, however, that many other devices may be used to select a desired operating mode.

The instrument 10 automatically enters the normal display mode of operation when power is applied. To access other display modes, the service and clear inputs 50,52 are grounded simultaneously. When both inputs 50,52 are grounded, a mode number corresponding to the current operating mode appears on a digital display 28. Preferably, the five operating modes are numbered from 0 through 4. If the service and clear inputs 50,52 both remain grounded for advantageously 2 seconds, the instrument 10 begins scrolling through the modes. When the desired mode is reached, i.e. the mode number corresponding to the desired operating mode is displayed on the digital display 28, the technician locks on to that mode by disconnecting the service and clear inputs 50,52 from ground.

While in the normal display mode, the instrument 10 displays sensed parameter levels and indicates warning conditions in response to sensed parameters being outside a given range. Vital vehicle functions are monitored and reported on the gauges and displays. The gauges 12 preferably indicate the level of a plurality of sensed parameters, for example, ground speed, engine RPM, oil temperature, fuel level, transmission oil temperature, and the like, and may be used in connection with any of a plurality of different machine types. In the preferred embodiment, one of the gauges 12 is a speedo/tacho gauge 13 that displays either the speed of the vehicle or the RPM of the engine or transmission and includes scaling digits for displaying the magnitude of the sensed parameter at various points along the speedo/tacho gauge 13. Since the desired scaling digits may be different for each machine, the instrument 10 modifies the scaling digits in response to choices made by the designers of the machine to which the instrument 10 is connected.

Fault and warning conditions are brought to an operator's attention by the indicator lights 14, a flashing gauge, a flashing alarm lamp, and/or a warning horn 17. Advantageously, the indicator lights 14 are lit in response to switch-type inputs being in a fault condition. In the preferred embodiment, one or more of the indicator lights 14 are associated with fault conditions for parameters indicated by the gauges 12.

When used in connection with some machines, it is also desirable for the instrument 10 to include turn signal indicators 32, a hi-beam light indicator 34, and a retarder indicator 36 for informing the operator that a transmission retarder is engaged on, for example, a large off-highway work vehicle. However, not all machines will use all functional indicators. Thus the instrument 10 controllably enables each of the functional indicators 32,34,36 that are needed by the machine to which the instrument 10 is connected. As is the case with the display segments associated with the gauges, the functional indicators are also of VF design and are substantially visible to the operator only when illuminated by the instrument.

The instrument 10 monitors itself and the I/O circuits for status, for intermittent-fault conditions, and for current present-fault conditions while in the normal display mode. The instrument 10 monitors both diagnosable inputs, i.e. those inputs that can be detected as being outside a valid range, and switch-type, non-diagnosable inputs. The instrument 10 also retains fault information relating to fault conditions on diagnosable inputs in non-volatile memory (not shown) within the instrument 10. Thus, the memory device (not shown) includes indications of each fault condition relating to a diagnosable input that has existed on the machine whether or not the fault condition is currently present. However, fault conditions on switch-type inputs are only indicated when present. Advantageously, the service and clear inputs 50,52 may be used to clear the stored fault information in one or more of the diagnostic modes.

If any fault conditions are sensed on the diagnosable inputs while in the normal display mode, either from the instrument 10 or from other system modules, a SERV CODE indicator 33 located adjacent the digital display 28 is illuminated. The SERV CODE indicator 33 is advantageously illuminated to report a detected condition regardless of the present status of the inputs, i.e., whether or not any input is presently in a fault condition. In this way, the operator and/or technician are informed that a fault condition has existed on the machine in the past even though none are currently present.

The instrument 10 operating in the normal display mode is sufficiently flexible to be used in connection with a number of different machines and to indicate a number of different parameters. For example, each gauge, except the central gauge indicating speedo/tacho information, is capable of indicating either a high warning condition or a low warning condition.

Each of the gauges 12 other than the speedo/tacho gauge 13 includes a plurality of indicating segments 16, high warning segments 18, and low warning segments 20. However, a single high or low warning segment 18,20 may be used. The high warning segments 18 are advantageously located in the most clockwise position on the gauge 12 and the low warning segments are located in the most counter-clockwise position on the gauge 12. When it is desirable to indicate the level of a parameter for which it is advantageous to indicate a warning when the parameter exceeds a certain level, for example engine temperature, the high warning segments 18 are enabled. To indicate the level of a parameter for which it is advantageous to indicate a warning when the parameter is below a certain level, for example fuel level, the low warning segments 20 are enabled. In some cases, it is advantageous to indicate both high and low warning conditions.

Advantageously, the gauges 12 also include a high outline segment 22, central outline segments 23, and a low outline segment 24, all of which being located around the periphery of each gauge and being illuminable. The high outline segment 22 is located adjacent the high warning segments 18 and the low outline segment 24 is located adjacent the low warning segments 20. The central outline segments 23 are located between the high and low outline segments 22,24. The central outline segments 23 are illuminated in response to the gauge 12 being used to indicate the level of a sensed parameter. In response to a parameter having a high warning value being indicated, the high outline segment 22 is illuminated; and in response to a parameter having a low warning value being indicated, the low outline segment 24 is illuminated. Thus, the appearance of the gauge 12 indicates that the displayed parameter has either a high or low warning level and better informs the operator that the level of the sensed parameter is approaching a warning level.

In the preferred embodiment, the high and low warning segments 18,20 are colored differently than the indicating segments 16; and the high and low outline segments 22,24 are colored differently from the central outline segments 23 and similarly to the high and low warning segments 18,20. Advantageously, the high and low warning segments 18,20 and high and low outline segments 22,24 are red and the indicating segments 16 and central outline segments 23 are blue-green. However, the low warning segments 20 and low outline segment 24 for the gauge 12 indicating fuel level are preferably yellow.

One or more of the gauges include a plurality of illuminable symbols 26 to identify the parameter being indicated. The symbols 26 are advantageously of VF design, blue-green in color, and selected from the symbols approved by ISO for indicating the parameters of interest. One of the symbols 26 is illuminated in connection with each gauge 12 so the operator can identify the indicated parameter. Thus, the gauge 12 is capable of indicating the level of one of two or more different parameters by illuminating one of the symbols 26. The parameter, and hence symbol 26, selected for each gauge 12 depends on the vehicle to which the instrument 10 is connected and choices made by the vehicle and system designers.

The digital display 28 indicates either speedometer or tachometer information in digital form. In the preferred embodiment, one of the speedo/tacho gauge 13 and digital display 28 indicates speedometer information while the other indicates tachometer information; however, either speedometer or tachometer information may be indicated on both if so desired. Advantageously, the digital display 28 is also adapted to indicate the level of other parameters when the instrument 10 is operating in a numeric readout mode or diagnostic information when the instrument 10 is operating in the service mode.

The gauges 12 are capable of displaying the parameter values in a plurality of display modes, including a single-bar mode and a fill-the-graph mode. In the single-bar mode, only one of the indicating segments 16 is illuminated when the level of the sensed parameter is within the normal operating range. Thus, the appearance of the gauge 12 simulates the appearance of a mechanical gauge. In the fill-the-graph mode, the level of the sensed parameter is indicated by illuminating a plurality of indicating segments 16 such that the appearance of the gauge 12 simulates a bar graph.

The instrument 10 selects a group of gauges and a display format for each parameter to be indicated on the machine type of interest in response to the identification code. The instrument 10 is shown in FIG. 3 with the optical filter 15 placed over the face of the instrument 10 including the VF display segments so that only the segments being illuminated by the instrument 10 are substantially visible to the operator.

Referring now to FIGS. 4a–4e, the operation of the gauges 12 is described. As shown in FIGS. 4a and 4b, when it is desirable to indicate the level of a parameter for which it is advantageous to indicate a warning when the parameter exceeds a certain level, for example hydraulic oil temperature, on one of the gauges 12 in the fill-the-graph mode, the high warning segments 20 are enabled, the high outline segment 22 is illuminated, and the indicating segments 16 are progressively illuminated in the clockwise direction as the sensed parameter increases from a low level to a maximum warning level. FIG. 4a illustrates a parameter for which it is desirable to indicate a high warning condition and being within the normal operating range.

As shown in FIGS. 4c and 4d, a parameter for which it is advantageous to indicate a warning when the parameter is below a certain level, for example fuel level, is indicated in the fill-the-graph mode by enabling the low warning segments 18 and illuminating the low outline segment 24. The indicating segments 16 are illuminated to indicate the sensed parameter being at a high level and progressively turned off in the counter-clockwise direction as the level of the sensed parameter decreases. FIG. 4c illustrates a parameter for which it is desirable to indicate a low warning condition and being within the normal operating range.

FIG. 4e illustrates a gauge 12 in the single-bar mode indicating the level of a sensed parameter for which it is desirable to indicate a warning when the parameter exceeds a certain level. The level of the sensed parameter is within the normal operating range. The indication of a parameter for which it is desirable to indicate a low warning condition in the single-bar mode would look similar to the gauge shown in FIG. 4e except the low outline segment 24 would be illuminated instead of the high outline segment 22.

For each parameter level being displayed on the gauge 12, a high or a low warning value is established as described below. The behavior of the gauge 12 in the fill-the-graph mode when the sensed parameter is above or below the high or low warning value, respectively, is best described in connection with FIGS. 4b and 4d.

For parameters having a high warning value, once the level of the sensed parameter exceeds the high warning value, all of the indicating segments 16, the central and high outline segments 22,23, the symbol 26, and one of the high warning segments 18 are caused to flash. As the level of the sensed parameter increases even farther, the second of the high warning segments 18 is also caused to flash. As shown in FIG. 4b, the sensed parameter has increased to a level at which all of the indicating segments 16, the symbol 26, the central and high outline segments 22,23, and both of the high warning segments 18 are all caused to flash.

With respect to a parameter having a low warning value, once the level of the sensed parameter decreases below the low warning value, the central and low outline segments 23,24, the symbol 26, and one of the low warning segments 20 are caused to flash. As the level of the sensed parameter decreases even farther, the second of the low warning segments 20 is also caused to flash. As shown in FIG. 4d, the sensed parameter has decreased to a level at which the central and low outline segments 23,24, the symbol 26, and both of the low warning segments 20 are all caused to flash.

The display of a sensed parameter in the single-bar mode when the level of the sensed parameter is above the high warning value includes the flashing of the central and high outline segments 22,23, the symbol 26, and one of the high indicating segments 18. Similarly, the display of a sensed parameter being below the low warning value in the single-bar mode includes the flashing of the central and low outline segments 23,24, the symbol 26, and one of the low indicating segments 20. Which of the two high or low indicating segments 18,20 to be flashed is determined in response to the degree to which the level of the sensed parameter is above or below the high or low warning values, respectively.

In addition to the above warning indications, the warning horn 17 or the alarm lamp may be activated when the level of the sensed parameter exceeds the high or low warning value.

A gear display 30 is advantageously disposed adjacent the digital display 28. The gear display 30 indicates the number and direction, i.e. forward, neutral, or reverse, of a vehicle transmission.

While in the service mode, the instrument 10 identifies and diagnoses fault conditions in diagnosable inputs, i.e. those inputs that can be detected as being outside a valid range. In the preferred embodiment, the sensors 11 diagnosed in the service mode are frequency based sensors or pulse-width modulated sensors having a duty cycle being indicative of the level of the sensed parameter. Predefined maximum and minimum frequencies or duty cycles define the valid range. If the sensor signal is outside the valid range, the instrument 10 recognizes the condition as a fault. The service mode also is used advantageously to determine whether certain circuits are shorted to ground, for example a warning horn circuit. If an input is unused on the machine to which the instrument 10 is connected, the instrument 10 ignores the unused input and does not indicate a fault condition.

The instrument 10 displays information relating to fault conditions stored in memory. Fault conditions are preferably identified by fault codes including a Module Identifier (MID), a Failure Mode Identifier (FMI), and a Component Identifier (CID). Advantageously, the MID, FMI, and CID are displayed on the instrument 10 by illuminable displays also used in connection with the instrument 10 operating in the normal display mode.

The Module Identifier indicates which module diagnosed the fault condition. The MID appears on the middle digits at the top center of the speedo/tacho gauge 13.

The Component Identifier indicates the component which has failed. The CID is advantageously displayed as 3 digits on the digital display 28.

The Failure Mode Identifier indicates the nature of the fault condition. The FMI advantageously appears as a 1 or 2 digit number on the gear display 30 and is followed by the letter F. If there are no fault codes available, the CID and FMI appear as "- - -" and "-F" respectively.

While in the service mode, system fault codes are viewed and/or cleared individually. Upon entering the service mode, the fault codes identifying the first available fault condition are displayed. To view the fault codes identifying the remaining fault conditions, the service input 50 is grounded. With the service input 50 grounded, the instrument scrolls through all available fault conditions. Any fault condition that is currently present is identified by the SERV CODE indicator 33 being illuminated. When the fault is not present, the SERV CODE indicator 33 is not illuminated.

When the service input 50 is disconnected from ground, the instrument 10 "locks" onto the fault condition associated with the currently-displayed fault codes. To clear a particular fault condition once it has been "locked", the clear input 52 is grounded. When a fault condition has been cleared, the fault codes associated with the next available fault condition appear as soon as the clear input 52 is disconnected from ground. By grounding and ungrounding the clear input with the service input ungrounded, all fault codes are cleared one at a time. Fault codes are saved by grounding the service input and scrolling past fault codes without clearing them. When all fault codes have been cleared, the display remains blank for 3 seconds, then the CID and FMI appears as "- - -" and "-F-", respectively.

A pin number is assigned to each of the inputs to the instrument 10. If the fault condition that has been "locked upon" represents a condition related to the instrument 10, the pin number associated with that condition is shown on the 2 digits normally used to display the full-scale units for the speedo/tacho gauge 13.

Pin numbers are also shown for change-of-state conditions, i.e. a change from being within the valid range to being outside the valid range or vice versa. The pin numbers monitored for this feature include all diagnosable conditions: not just the fault condition upon which the instrument 10 is "locked." Thus, for example, even though "locked upon" a transmission temperature diagnostic, if while inspecting or disturbing the harness, the transmission temperature and the fuel level and the brake air pressure all changed state, the connector pin numbers associated with each of these parameters are scrolled. The place where the pin number(s) for change-of-state conditions are shown is the 2 digits normally used to display the three-fourths-of-full-scale units for the speedo/tacho gauge 13.

As stated earlier, in the service mode the SERV CODE indicator 33 is illuminated for present faults and turned off otherwise. When the instrument 10 is locked on a particular fault condition, the SERV CODE indicator 33 is aided by the warning horn 17. The warning horn 17 sounds briefly each time the SERV CODE indicator 33 changes state. Note that the warning horn 17 sounds only for changes in the "locked" condition while in the service mode. If there is a change-of-state of any of the other diagnosed conditions within service mode, the warning horn 17 does not sound.

When, for instance, the instrument is "locked" on a particular diagnostic code, service personnel may watch the SERV CODE indicator 33 while manipulating the wire harness or disturbing a connector or plugging/unplugging a sensor to help determine the location or cause of an intermittent problem. In this example, typically two people are needed to make the procedure efficient since the wire harness and connectors to be manipulated are often located remotely from the instrument 10. To help one person be an effective troubleshooter, the warning horn 17 is used as a special audible version of the SERV CODE indicator 33 since the warning horn 17 sounds briefly each time the SERV CODE indicator 33 changes state.

FIG. 5 illustrates the instrument 10 operating in the service mode. The pin numbers are shown for the locked condition and for the change-of-state condition. As noted above, pin numbers are shown only when locked on a particular code. When leaving a locked-code state, that is advancing to another fault condition or leaving the service mode, all pin number information is erased from memory and is no longer displayed.

Figure 6:
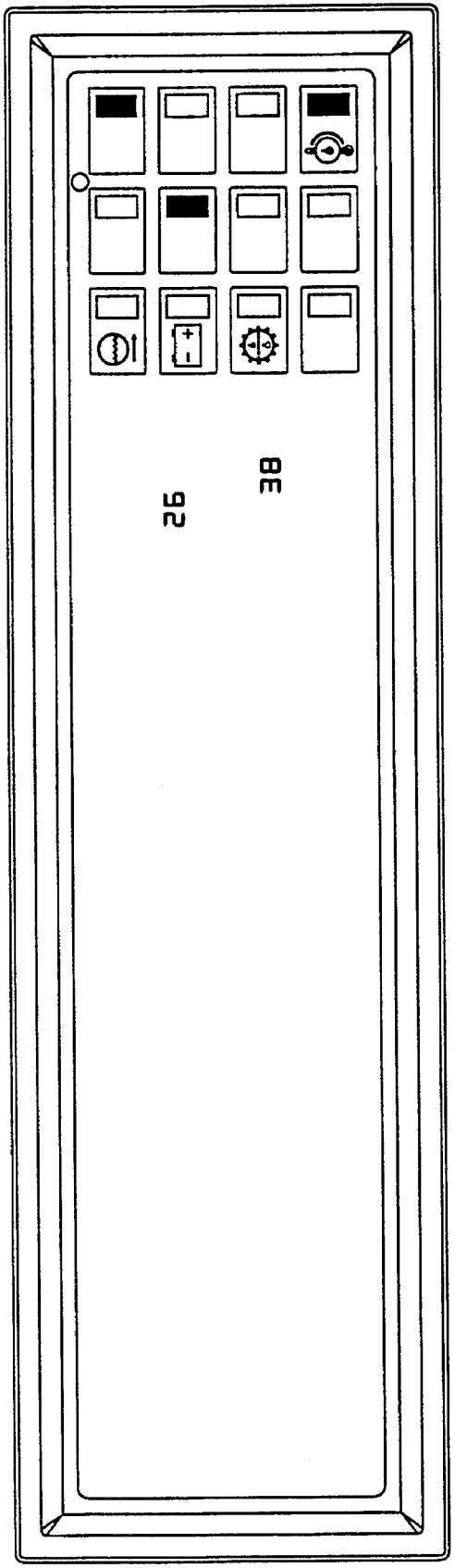
FIG. 6 illustrates the computerized monitoring and diagnostic system functioning in a status mode.

Referring now primarily to FIG. 6, the status mode is preferably used to identify fault or warning conditions in switch-type inputs that are not easily diagnosed and are generally used in connection with the indicator lights 14. The switch-type inputs advantageously include switch inputs, vehicle identification codes, and various other inputs having a limited number of possible states and indicate one of a normal state and a fault condition. Advantageously, the fault condition corresponds to an open or floating voltage condition.

Some of the inputs are used to program the instrument 10 to perform certain functions and may be either at ground potential or an open or floating voltage condition and are thus treated as switch-type inputs in the status mode. For the purposes of discussion, the term fault condition with respect to the switch-type inputs is used generically to refer to an open voltage condition. However, it should be appreciated that other voltage conditions or electrical signals could be defined as corresponding to the fault condition without deviating from the invention. Thus, the programming switch-type inputs are referred to as being in the fault condition when in the open voltage condition even though it may in fact be desirable for that programming input to be at the open voltage condition. Similarly, when a switch-type sensor produces an open voltage condition on one of the switch-type inputs in response to the sensed parameter being outside a normal operating range, the switch-type input is also referred to as being in a fault condition.

The indicator light 14 function while in the status mode is advantageously defined such that an indicator light 14 is flashed when the associated input is in an open voltage condition and is turned off when the associated input is at ground potential. In the preferred embodiment, there are more switch-type inputs to be indicated in the status mode than the number of available indicator lights 14. To indicate all of the desired inputs, the clear input 52 is used to toggle between two sets of inputs. Thus when the clear input 52 is grounded, one set of inputs is displayed on the indicator lights 14 and when the clear input 52 is open, the other set of inputs is displayed.

Pin number(s) of monitored conditions presently in the fault condition are shown/scrolled on the 2 digits normally used to show the full-scale units for the speedo/tacho gauge 13. It should be noted that all pin numbers corresponding to inputs presently in a fault condition are displayed regardless of the state of the clear input 52. When the pin number is shown for a parameter presently displayed by an indicator light 14, that indicator light is steadily illuminated rather than flashed. If the condition changes, i.e. the parameter goes to a non-fault condition, the indicator light 14 turns off and the pin number is no longer displayed as being in a fault condition. As described above, the indicator lights 14 are only flashed or steadily illuminated in response to the state or pin number display, respectively, of inputs to which they are assigned in response to the state of the clear input 52.

Pin number(s) are also displayed for a status change of any of the parameters monitored in the status mode, e.g., a change from open to ground or ground to open. In the case of multiple changes, the pin numbers are scrolled. These pin numbers are displayed on the 2 digits normally used to display the three-fourths-of-full scale units for the speedo/tacho gauge 13. The pin number information relating to inputs having changed status is erased from memory in response to leaving the status mode by simultaneously grounding the service and clear inputs 50,52.

The warning horn 17 is used in the status mode to augment the usefulness of the indicator lights. The warning horn 17 sounds briefly each time one of the switch-type inputs changes state. The sounding of the warning horn 17 occurs for any of the parameters available in status mode. The augmentation added by the warning horn 17 makes it possible for the technician to determine when a change-of-state has occurred even when working remotely from the instrument 10 which is advantageously fixedly located in the operator's station of a vehicle.

While in the tattletale mode, all gauges and readouts are displayed in the most extreme readings since the previous time the tattletale mode was cleared. Low warning style gauges display the minimum readings. High warning style gauges display the maximum readings. The speedo/tacho gauge 13 displays the maximum reading. Also, any indicator light 14 that was activated since the previous time the tattletale mode was cleared is activated.

As an aid to the diagnosis of faulty sensors, the numeric readout mode is included to digitally display the magnitude of sensed parameters. In the preferred embodiment, a number is displayed on the digital display 28 indicating the level of the sensed parameter in engineering units. For example, if the instrument 10 determines that the oil pressure is 100 kPa, then the digital display 28 indicates the number 100 to represent 100 kPa. In the preferred embodiment, the number displayed for system voltage is equivalent to the sensed voltage multiplied by ten. Thus, if the sensed system voltage is 23.5, the digital display 18 indicates the number 235. Alternatively, the sensor signal is displayed as a percent of the full scale reading of the parameter sensor 11. For example, if the sensor is pulse width modulated and has a duty cycle of 50 percent, then the digital display 28 indicates the number 50 to represent that the sensor signal is at 50 percent of full scale.

Each parameter is advantageously displayed in engineering units as follows:

| Temperatures | degrees C. |
| Pressures | kPa |
| Speeds | RPM |
| Ground Speed | MPH or km/h |

Parameters are identified by their parameter number which is indicated on the gear display 30, for example, as follows:

| PARAMETER # | PARAMETER |
| --- | --- |
| 0 | Ambient Light Level |
| 1 | Gauge 1 |
| 2 | Gauge 2 |
| 3 | Gauge 3 |
| 4 | Gauge 4 |
| 5 | Gauge 5 |
| 6 | Gauge 6 |
| 7 | Engine Speed |
| 8 | Vehicle Speed |
| 9 | System Voltage | where the gauges 12, other than the speedo/tacho gauge 13 are numbered from left to right, top to bottom starting with the upper left hand gauge such that the upper left hand gauge is known as gauge and the lower right hand gauge is known as gauge 6.

In addition to the parameter number, the parameters associated with the gauges 12, other than the speedo/tacho gauge 13, are identified by flashing the central outline segments 23 and one of the high and low outline segments 22,24 for the gauge indicating that parameter value. The parameter being displayed by the flashing outline segments is identified by referring to the illuminated symbol 26 corresponding to the parameter being indicated by that gauge. Alternatively, the symbol 26 may also be flashed either independent from or in conjunction with the flashing outline segments when the associated parameter number is selected. When engine speed or ground speed is selected, the correct units label (i.e. RPM, MPH, or km/h) is illuminated to the right of the digital display 28. In the cases of ambient light level and system voltage, the parameter number displayed on the gear display 30 is the only means for identifying the parameter, therefore the technician must refer to a table to correlate the parameter number to the indicated parameter.

Figure 7:
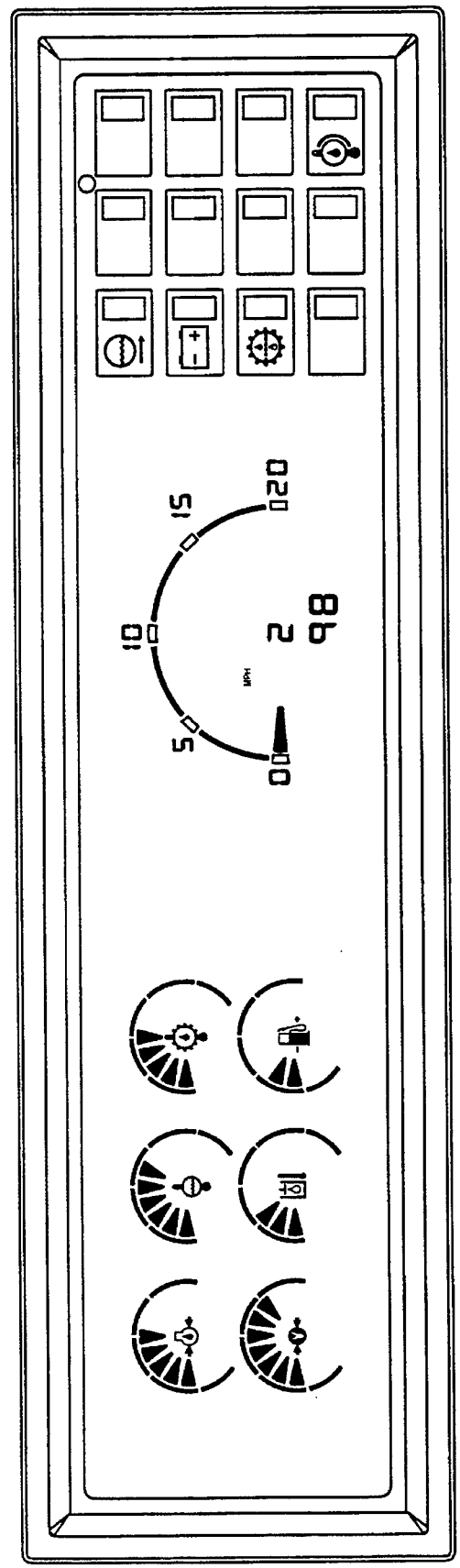
FIG. 7 illustrates the computerized monitoring and diagnostic system functioning in a numeric readout mode.
Figure 8A:
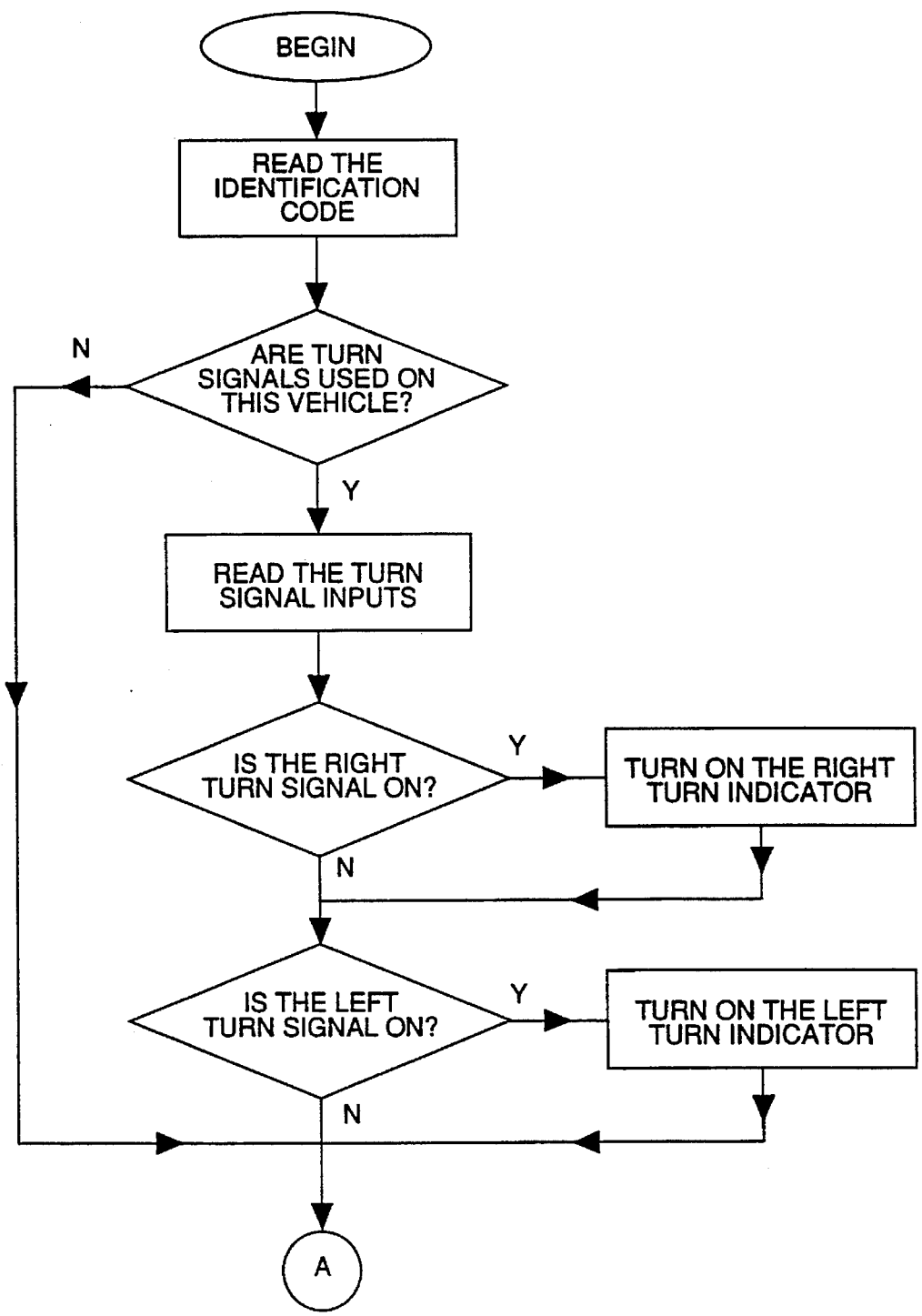
Figure 8B:
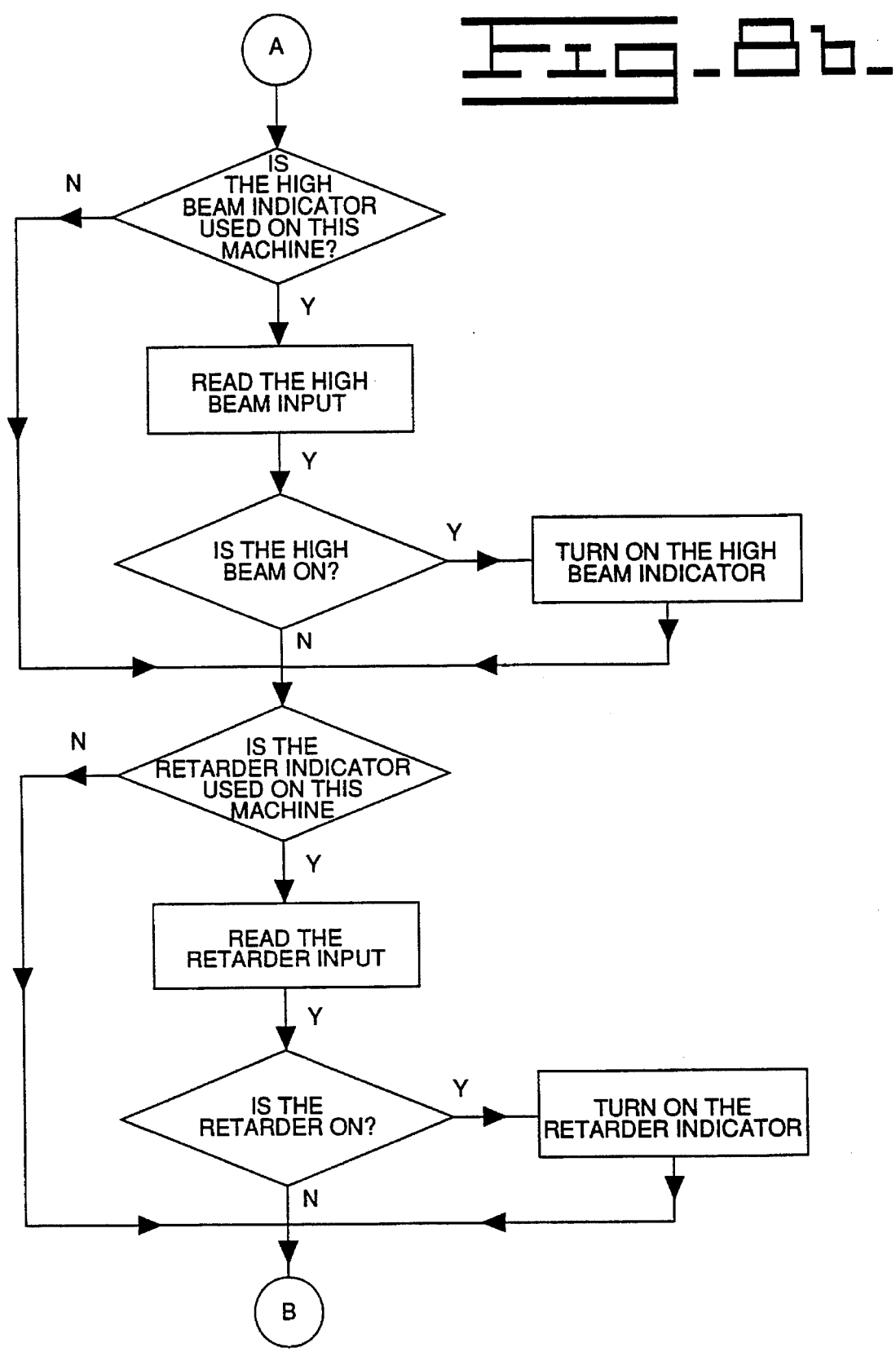

For example, the instrument 10 functioning in the numeric readout mode is shown in FIG. 7. The speedo/tacho gauge 13 is displaying speedometer information in MPH. The engine coolant temperature is displayed by the digital display 28 as 98 degrees Celsius, the gear display 30 is indicating gauge 2, and the central and high outline segments 22,23 for the top center gauge, i.e. gauge 2, are flashed. Advantageously, the gauge outline segments of the selected gauge are flashed at a 1 Hz rate.

Upon entering the numeric readout mode, the gear display 30 indicates parameter 0, which preferably corresponds to ambient light level. When the service input 50 is grounded, the gear display 30 begins scrolling through the parameters. By ungrounding the service input 50, the instrument 10 is "locked onto" a given parameter. The numeric readout mode is exited by simultaneously grounding both the service input 50 and the clear input 52 for advantageously 2 seconds.

In the preferred embodiment, the parameter levels being displayed in graphical form on the gauges 12 while in the normal display mode are also displayed in graphical form in the numeric readout mode. The indicating segments to be illuminated and the warning levels are established as described above in connection with the normal display mode. Thus the technician is able to view all of the parameters in graphical form in addition to being able to view each of the parameters in digital form by scrolling and/or "locking onto" each of the parameters individually. Any parameter that is not used by the machine or for which a sensor signal is not being received is displayed as a zero on the digital display 28 when the corresponding parameter number is being displayed on the gear display 30.

The brightness of the VF display segments may be determined in a number of different ways depending on the machine to which the instrument is connected. In connection with some machines, the brightness level is determined solely in response to a photocell 38 that produces an electrical signal in response to the level of ambient light in a manner well-known in the art.

In connection with other machines, the brightness level is determined in response to both the photocell 38 and a brightness switch 40. The brightness switch may be either a single-pole, double-throw switch or a single-pole, single-throw switch. If the photocell 38 is to be used in tandem with a single-pole, double-throw momentary switch, the operator adjusts the brightness level either up or down from the value selected by the photocell 38, depending on which way the brightness switch 40 is activated. The single-pole, double-throw switch controls a brightness down input and a brightness up input in the instrument 10. When the brightness down input is grounded, the display brightness decreases in steps until the minimum brightness level is reached. When the brightness up input is grounded, the display brightness increases in steps until the maximum brightness level is reached.

In connection with still other machines, the brightness level is determined in response to both the photocell and a single-pole, single-throw switch. When the brightness switch input is grounded, the display brightness cycles; first the brightness decreases in steps to the minimum level, and then increases in steps to the maximum level.

When used in connection with some machine types, the instrument 10 may also be connected to one or more electronic controls 46 via a communication link 48. In the preferred embodiment, the communication link 48 is a two-way serial communication link on which the instrument 10 can both transmit and receive information. In the preferred embodiment, the instrument 10 builds a serial data message which may include a module identifier corresponding to the electronic control 46 to receive the data, an identifier for each scaled parameter to be transmitted over the communication link, the scaled data representing the level of the parameter associated with each identifier, and the status of each switch-type input. Once the message is built, the instrument 10 transmits the message over the communication link 48.

Since the communication link 48 is typically used for other purposes, it is advantageous to reduce the amount of communications traffic on the communication link 48. This is possible because each machine does not include all of the possible electronic controls 46 and each of the electronic controls 46 does not require all of the sensor data that is available. Each of the electronic controls 46 may also require updates at different rates. The communication rate for each machine and electronic control is therefore also established in response to the identification code. As described above, the instrument 10 retrieves identifiers to determine what information is to be sent to which electronic control 46 and at what rate in response to the identification code.

In the preferred embodiment, the instrument 10 executes the algorithm illustrated by the flow chart in FIGS. 8a–f while operating in the normal display mode. The instrument 10 reads the identification code from the identification means 42 and determines whether the turn signal indicators 32 are to be enabled by retrieving a turn signal identifier from a memory device (not shown) within the instrument 10 in response to the identification code. If the turn signal indicators 32 are enabled, the instrument 10 reads the turn signal, switch-type inputs and determines whether each of the left or right turn signal indicator 32 is to be activated. The instrument 10 responsively causes the left or right turn signal indicator 32 to flash if either the left or right turn signal is activated, respectively.

The instrument 10 determines whether the high beam indicator 34 is to be enabled in response to an identifier retrieved from memory (not shown) in response to the identification code. If the high beam indicator 34 is enabled, the instrument 10 reads the high beam, switch-type input and determines whether the high beam indicator should be illuminated. The instrument 10 responsively illuminates the high beam indicator 34 if the high beam input is at a state being defined to indicate that the high beam lights are activated.

The instrument 10 determines whether the retarder indicator 36 is to be enabled in response to an identifier retrieved from memory (not shown) in response to receiving the identification code. If the retarder indicator 36 is enabled, the instrument 10 reads the retarder, switch-type input (not shown) and determines whether the retarder indicator 36 should be illuminated. The instrument 10 responsively illuminates the retarder indicator 36 if the retarder input is at a state being defined to indicate that the retarder is engaged.

In response to the identification code of the machine, the instrument 10 retrieves a display brightness identifier from memory (not shown). The display brightness identifier informs the instrument 10 whether the display brightness level is to be controlled in response to a photocell 38 only, a photocell 38 and a single-pole, single-throw switch 40, or a photocell 38 and a single-pole, double-throw switch 40. The display brightness identifier thus has one of three states being defined within the instrument 10 to control the display brightness level in one of the three manners.

If the display brightness identifier indicates that the brightness level is to be controlled in response to the photocell 38 only, the instrument 10 reads a control signal from the photocell input only. The signal from the photocell 38 is dependent upon the level of ambient light. Thus the instrument 10 is able to adjust the drivers of the VF display segments to control the display brightness level in response to the level of ambient light.

If the display brightness identifier indicates that the brightness level is to be controlled in response to the photocell 38 and a single-pole, single-throw switch (SPST), the instrument 10 reads control signals from both the photocell input and the brightness switch input. The signal from the photocell 38 is dependent upon the level of ambient light and the signal from the brightness switch 40 is dependent upon operator action. The control signals from the photocell 38 and SPST switch 40 work in tandem to cause the instrument 10 to control display brightness. The photocell 38 controls the brightness level as described above; however, the operator can manually adjust the brightness level by actuating the SPST switch 40.

When the brightness switch input is grounded, the instrument 10 responsively cycles the display brightness level. First the instrument 10 decreases the brightness level in steps to the minimum level, and then increases the brightness level in steps to the maximum level. The magnitude of the steps are selected in response to the desired degree of control and the desired number of actuations required in one cycle of brightness levels. After the display brightness has been manually adjusted, the photocell continues to control display brightness as described above in response to changes in the ambient light level.

If the display brightness identifier indicates that the brightness level is to be controlled in response to the photocell 38 and a single-pole, double-throw (SPDT) momentary switch 40, the instrument 10 reads control signals from the photocell input and the two brightness switch inputs from the SPDT switch 40 known as the brightness up and brightness down inputs. The signal from the photocell 38 is dependent upon the level of ambient light and the signal from the brightness switch 40 is dependent upon operator action.

The control signals from the photocell 38 and SPDT switch 40 work in tandem to cause the instrument 10 to control display brightness. The photocell 38 controls the brightness level as described above; however, the operator can manually adjust the brightness level by actuating the SPDT switch 40 in each of the two directions. The operator adjusts the brightness level either up or down from the value selected by the photocell 38, depending on which way the SPDT switch 40 is activated. The SPDT switch 40 controls a brightness down input and a brightness up input.

The instrument 10 adjusts the drivers of the VF display segments to control the display brightness level in response to the photocell input and the brightness up and brightness down inputs. When the brightness down input is grounded, the instrument 10 decreases the display brightness level in incremental steps until the minimum brightness level is reached. When the brightness up input is grounded, the display brightness increases in steps until the maximum brightness level is reached. The magnitude of the steps are selected in response to the desired degree of control and the desired number of actuations required in one cycle of brightness levels. After the display brightness has been manually adjusted, the photocell 38 continues to control the display brightness level as described above in response to the ambient light level.

For each of the gauges other than the speedo/tacho gauge 13, the instrument 10 determines whether the gauge is a high or low warning style gauge. Advantageously, this is determined by retrieving a gauge style identifier from memory within the instrument 12 for each gauge to be used. The gauge style identifier is retrieved from the memory device in response to the identification code. Each of the gauge style identifiers are selected in response to choices made by the vehicle designers regarding which parameters are to be displayed and the preferred display format for each parameter.

If the gauge is a low warning style gauge, the low outline segment 24 is illuminated and the low warning segments 20 are enabled. If the gauge is a high warning style gauge, the high outline segment 22 is illuminated and the high warning segments 18 are enabled.

The instrument 10 reads the sensor signals from the wire harness. Since the sensor signals may be in the form of pulse-width modulated signals, frequency signals, or switch-type binary signals, the instrument 10 converts and scales the inputs to a microprocessor readable form in manners well-known in the art. For example, if the output from one of the pulse-width modulated sensors is sensing oil pressure and has a duty cycle of 70% and the range of the scaled signal is from 0–255, the binary number 179 is assigned as the scaled sensor data for the oil pressure parameter.

In response to the scaled sensor data from the pulse-width modulated and frequency sensors, the instrument 10 determines which segments are to be illuminated on each gauge. In the preferred embodiment, the memory device (not shown) includes a plurality of stored parameter values corresponding to each possible magnitude of the scaled data for each sensed parameter. The memory device (not shown) also includes a plurality of segment numbers included in a look-up table of a type well-known in the art to indicate the number of segments to be illuminated in response to each of the stored parameter values. The instrument 10 thus maps the parameter value to the number of segments to be illuminated on the associated gauge. Alternatively, an equation could be developed defining the relationship between the parameter values and the segment commands and could be solved in place of the use of the look-up table. Similarly, the scaled data could be mapped directly to the segment numbers.

In the preferred embodiment, the high and low warning segments 18,20 and indicating segments 16 are numbered, starting with the most counter-clockwise positioned segment and progressing in the clockwise direction, from 0 through 12. Provided that the sensed parameter is not below the low warning value, neither of the low indicating segments 20 is illuminated. Thus, if the number 7 is retrieved as the number of segments to indicate in the fill-the graph mode, then segments 2 through 7 are illuminated as shown in FIG. 4a. If the number 12 is retrieved as the number of segments to indicate in the fill-the-graph mode and the gauge is a high warning style gauge, then segments 2 through 12 are caused to flash as shown in FIG. 4b. If the number 4 is retrieved as the number of segments to indicate in the fill the graph mode and the gauge is a low style warning gauge, then segments 2 through 4 are illuminated as shown in FIG. 4c. If the number 0 is retrieved as the number of segments to indicate in the fill-the-graph mode and the gauge is a low style warning gauge, then segments 0 and 1 are caused to flash as shown in FIG. 4d. If the gauge is in the single-bar mode, then the segment corresponding to the retrieved number is the only one of the warning and indicating segments 16,18, 20 that is illuminated or caused to flash.

If the number 0 or 1 is retrieved, the parameter is considered to be below the low warning value, and if the number 11 or 12, the parameter is considered to be above the high warning value.

In keeping with the above example, suppose that the scaled sensor data received from the instrument and associated with the oil pressure in an engine is 179 and that the oil pressure is to be displayed in the low warning format. The instrument would retrieve for example the number 6 from the look-up table and segments 2 through 6 would be illuminated if in the fill-the-graph mode.

The instrument 10 reads the display mode identifier from the identification line connected to the display mode select means 41 and builds and transmits a serial data message over the communication link. To build the message, the instrument 10 retrieves a communication identifier from memory in response to the identification code. The instrument 10 responsively determines which sensor data is to be transmitted to which electronic controls 46. The communication identifier advantageously includes a group of commands of a type well-known in the art instructing the instrument 10 to build and transmit a serial data message.

The communication identifier preferably also includes a command establishing the period of time between data transmissions so the sensor data being sent to each of the electronic controls 46 is updated at the appropriate rate. The instrument 10 responsively builds and transmits the serial data message over the communication link 48 at the desired rate.

If the gauge includes a plurality of symbols 26, the instrument 10 produces a control signal to illuminate one of the symbols 26 in response to a symbol identifier that is retrieved from the memory device (not shown). In the preferred embodiment, the gauge includes two symbols and the symbol identifier indicates which of the two symbols 26 should be illuminated in response to the parameter assigned to that gauge. Since the parameter assignment is made in response to the identification code, the symbol identifier is also advantageously retrieved in response to the identification code.

In response to the display mode identifier, the instrument 10 determines whether the parameters should be displayed in the fill-the-graph mode or the single-bar mode. In the preferred embodiment, the fill-the-graph mode is indicated when the display mode identifier is in an open or floating voltage condition and the single-bar mode is indicated when the display mode identifier is at a ground potential.

If the display mode identifier is at an open or floating voltage condition and thus in the fill-the-graph mode, the instrument determines whether the gauge is a high or low warning style gauge in response to the gauge style identifier described above. If the gauge is a low warning style gauge, the gauge either illuminates or flashes the appropriate portions of the gauge in response to the retrieved segment number determined as described above. Similarly, if the gauge is a high warning style gauge, the instrument 10 either illuminates or flashes the appropriate portions of the gauge in response to the retrieved segment number determined as described above.

If the display mode identifier is at a ground potential and thus in the single-bar mode, the instrument 10 determines whether the gauge is a high or low warning style gauge in response to the gauge style identifier described above. If the gauge is a low warning style gauge, the gauge either illuminates or flashes the appropriate portions of the gauge in response to the retrieved segment number determined as described above. Similarly, if the gauge is a high warning style gauge, the instrument 10 either illuminates or flashes the appropriate portions of the gauge in response to the retrieved segment number determined as described above.

In response to the switch-type inputs, the electronic control 10 determines whether and which indicator lights 14 should be flashed in a manner well-known in the art. For example, if the data message associated with a particular switch-type input indicates that the switch-type sensor has been activated in response to a fault condition, the indicator light 14 associated with that switch-type sensor is illuminated.

Figure 9B:
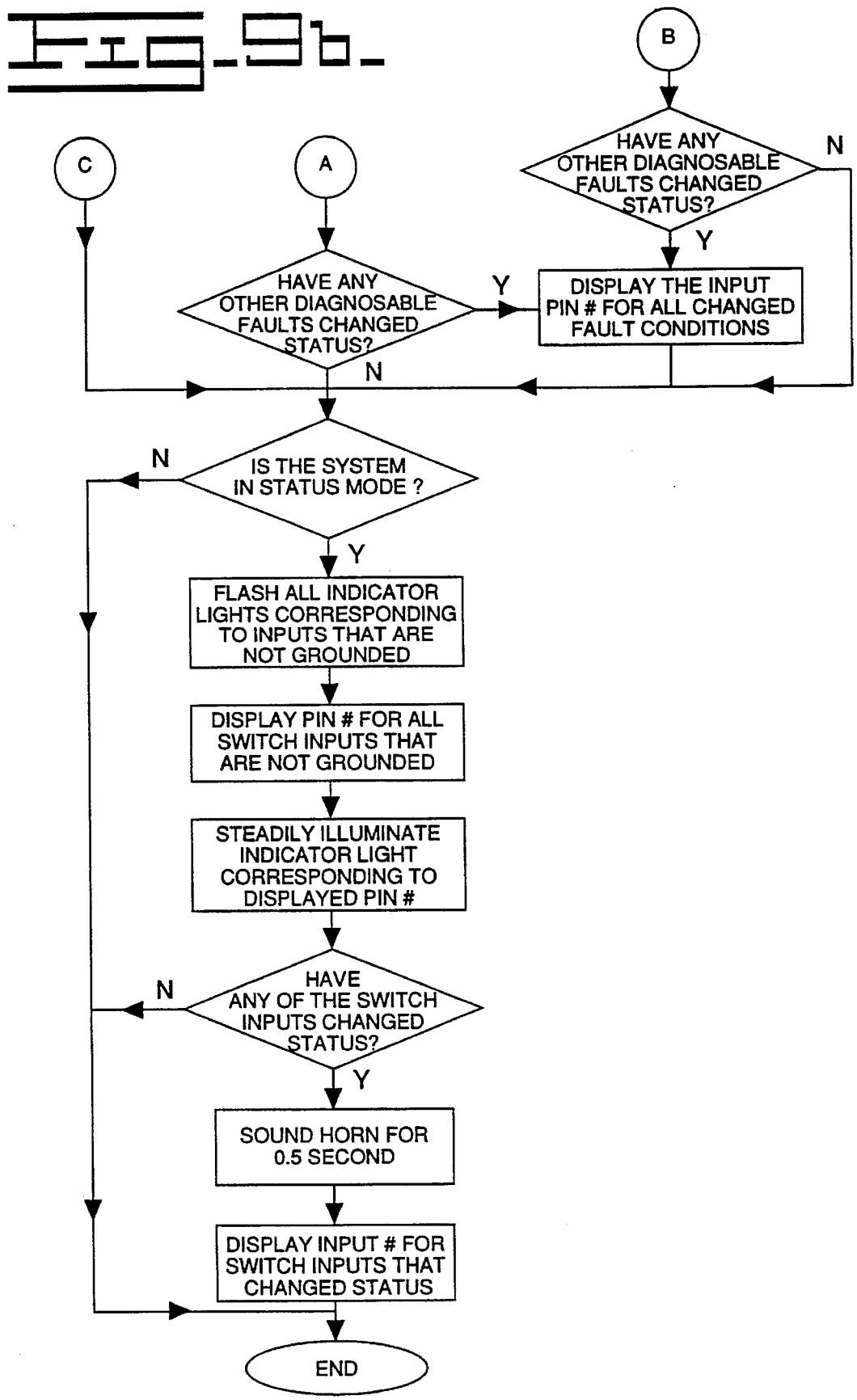

Referring now to FIGS. 9a and 9b, a flow chart of an algorithm illustrating operation of the instrument 10 while in the service and status modes is shown. The instrument 10 reads the identification code and responsively retrieves a number of identifiers from a memory device (not shown) within the instrument 10. The identifiers are defined such that the microprocessor (not shown) within the instrument 10 determines, for that particular machine, the parameter monitored at each input from the wire harness, the parameter to be displayed on each gauge, the status report level for each input, the signal filtering, debounce, scaling, or averaging characteristics associated with each input, and the switch-type input associated with each indicator light 14. The instrument 10 reads all of the inputs being used in connection with the machine to which it is connected and performs the system diagnostics on those inputs as described above.

If the instrument 10 is in the service mode, the instrument 10 produces a plurality of control signals causing a plurality of fault codes to be displayed with respect to one of the stored fault conditions which may or may not be currently present. The MID associated with the fault condition is displayed on the middle scaling digits at the top center of the speedo/tacho gauge 13. Similarly, the instrument 10 produces control signals to cause the CID associated with the fault condition to be displayed as 3 digits on the digital display 28, the FMI associated with the fault condition to appear as a 1 or 2 digit number on the gear display 30 and is followed by the letter F, and the SERV CODE indicator 33 to be illuminated if the fault condition is currently present. The instrument 10 also produces a control signal to indicate the pin number of the sensor signal for which the fault codes are displayed. Preferably, the pin number is displayed on the 2 digits normally used to display the full-scale units for the speedo/tacho gauge 13.

If the service input 50 is grounded, the instrument 10 causes the fault codes and associated pin number for each of the stored fault conditions to be scrolled on the available displays such that each is displayed for a predefined period of time before being replaced by the fault code and associated pin number of another stored fault condition, and so forth. Once all of the stored fault conditions have been displayed, the sequence is repeated.

If the technician disconnects the service input 50 from ground potential, the fault codes and associated pin number are "locked onto" and the instrument 10 responsively stores the present status of each of the diagnosable sensor inputs in memory. That is, the memory device (not shown) includes an identifier for each of the diagnosable sensor signals indicating whether it is in a fault condition or a normal state at the time the service input 50 is removed from ground potential.

The instrument 10 compares the current status of the locked input to the status stored in memory for that input. If the currently displayed fault condition has changed status, then the instrument 10 stores the new status of that input in place of the previous status and produces a control signal causing the warning horn 17 to produce an audible signal for advantageously 0.5 seconds. The instrument also produces a command to cause the pin number of that input to be displayed on the 2 digits normally used to display the three-fourths-of-full-scale units for the speedo/tacho gauge 13.

Regardless of whether the currently displayed fault condition has changed status, the instrument 10 determines whether any other diagnosable sensor inputs have changed status in a similar manner by comparing the current status of each diagnosable sensor input to the status stored in memory for that input. If one or more of the inputs have changed status, then the new input status of each of the changed inputs is stored in memory in place of the earlier status and the instrument 10 produces a control signal causing the pin number for each input that has changed status to be displayed on the 2 digits normally used to display the three-fourths-of-full-scale units for the speedo/tacho gauge 13. If there is more than one input that has changed status, the instrument 10 causes the pin numbers to scroll by alternatively producing commands to display each of the pin numbers.

If the instrument 10 is in the status mode, the instrument 10 stores the status, i.e., grounded or open voltage condition, in memory for each of the switch-type inputs. In response to one of the switch-type inputs being in an open voltage condition, the instrument 10 produces a command causing the 2 digits normally used to display the full-scale units for the speedo/tacho gauge 13 to indicate the pin number associated with that switch-type input. If more than one switch-type input is in an open voltage condition, the instrument 10 causes the pin numbers to scroll by alternatively producing commands to display each of the pin numbers. Advantageously, the inputs are divided into a group including predominantly switch-type sensors and a group including predominantly programming inputs.

Each of the switch-type inputs, including both the switch-type sensors and the programming inputs, is assigned a pin number corresponding to the connector contact number on which the signal is received. In addition, each of the switch-type inputs being selected by the clear input 52 is assigned to one of the indicator lights 14. As set forth above, when there are more switch-type inputs than indicator lights 14, only a select group of inputs are assigned to the indicator lights 14 in response to the state of the clear input 52. Advantageously, a table is also provided for reference by the technician to aid in identification of the switch-type input corresponding to each of the pin numbers and indicator lights 14.

The instrument 10 also reads the clear input 52 and responsively produces a command to flash each of the indicator lights 14 assigned to one of the switch-type inputs having an open circuit condition. Each time a pin number corresponding to one of the indicator lights 14 assigned to one of the switch-type inputs being in an open circuit condition is displayed on the full-scale units of the speedo/tacho gauge 13, the instrument causes that indicator light 14 to be steadily illuminated rather than flashed.

The instrument 10 also determines whether any of the switch-type inputs have changed status by comparing the current status of each of the switch-type inputs to the status stored in memory for that input. If any of the switch type inputs have changed status, the instrument 10 stores the new status in memory, produces a control signal causing the warning horn 17 to produce an audible signal for advantageously 0.5 seconds, and produces a command causing the 2 digits normally used to display the three-fourths-of-full-scale units for the speedo/tacho gauge 13 to indicate the pin number associated with the changed input. If more than one switch-type input has changed status, the instrument 10 causes the pin numbers to scroll by alternatively producing commands to display each of the pin numbers.

Within each of the service and status mode, the function of determining whether each of the inputs have changed status is repeated at predefined intervals. Advantageously, the interval is selected to be sufficiently short that substantially any intermittent change of status caused by manipulations of the wire harness or connectors by the technician is detected.

Figure 10A:
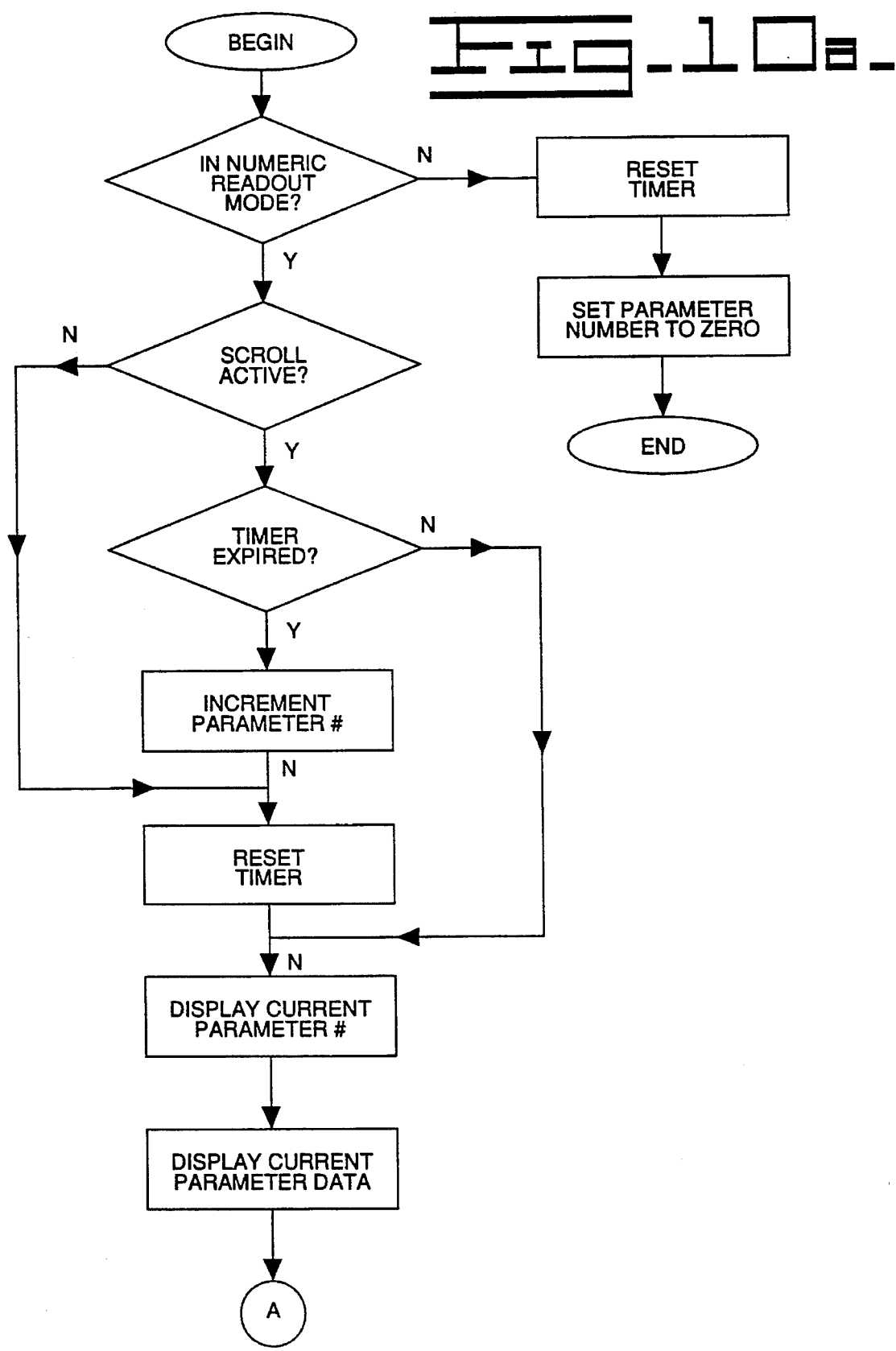
FIGS. 10a land 10b illustrate a flow chart of an algorithm used in connection with a preferred embodiment of the invention functioning primarily in the numeric readout mode.

In the preferred embodiment, the instrument 10 executes the algorithm illustrated in FIGS. 10a and 10b while operating in the numeric readout mode. The instrument 10 reads the service and clear inputs 50,52 and in response to receiving a grounded signal on both of the service and clear inputs 50,52, the instrument 10 individually produces commands to display the mode numbers on the digital display 28 for a predefined length of time. When the service and clear inputs 50,52 are removed from ground potential while the instrument is producing the command to display the mode number corresponding to the numeric readout mode, the instrument 10 begins operating in the numeric readout mode.

If the instrument 10 is not in the numeric readout mode, a timer is reset to zero and the parameter number is set to zero in the memory device within the instrument 10. If the instrument 10 is operating in the numeric readout mode, the instrument 10 determines whether the parameter numbers should be scrolled by reading the service input 50.

If the service input 50 is not grounded, the timer is reset to zero and the instrument 10 produces a command to display the current parameter number on the gear display 30. If the service input 50 is grounded, the timer is checked to determine whether it has exceeded a predefined maximum. If the timer has exceeded the predefined maximum, the parameter number is increased by one, the timer is reset to zero, and the instrument 10 causes the current parameter number to be displayed on the gear display 30. If the predefined maximum has not been exceeded, the instrument 10 produces a command to display the current parameter number on the gear display 30.

Since the memory device includes identifiers assigning one of the sensed parameters to each of the gauges 12 used on each machine to which the instrument 10 may be connected, the instrument 10 determines which parameter is assigned to each gauge 12 by retrieving the identifiers for that machine from memory in response to the identification code. Also in response to the identification code, the inputs are defined for the parameters to be displayed in the numeric readout mode but which are not assigned to one of the gauges 12. Similarly, a symbol 26 is also illuminated for each of the used gauges 12 in response to the symbol identifier retrieved from memory in response to the identification code, as set forth above in connection with the normal display mode.

The instrument 10 reads all of the sensor inputs and graphically displays each of the parameters assigned to the gauges 12. The segments illuminated on each gauge is determined by scaling the sensor signal, retrieving a parameter value in engineering units from memory in response to the scaled sensor signal, and retrieving a segment number from memory in response to the parameter value which is representative of the number of gauge segments to be illuminated, as described above in connection with the normal display mode.

The level of the parameter corresponding to the currently displayed parameter number is displayed digitally on the digital display 28. In one embodiment, the parameter value in engineering units that was retrieved from memory in response to the scaled sensor data is displayed; whereas in another embodiment, the scaled sensor signal is divided by a full scale value. The instrument 10 then causes the digital display 28 to indicate the value of this ratio and thus indicate the percent of full scale being indicated by the sensor.

For example, suppose the scaled sensor data, described in connection with the operation of the numeric display mode, is 128. The instrument 10 responsively retrieves 100 kPa from memory as the stored parameter value for oil pressure and produces commands causing the digital display 18 to indicate the number 100 to represent 100 kPa. Alternatively, the sensor signal is displayed as a percent of the full scale reading of the parameter sensor 11. For example, if the scaled sensor data is 128 and the range of possible values is 0–255, then the instrument 10 produces commands to cause the digital display 18 to indicate the number 50 to represent that the sensor signal is substantially at 50 percent of full scale.

If the currently displayed parameter number corresponds to one of gauges 1 through 6, the instrument 10 produces a signal to flash the outline segments of the selected gauge at preferably 1 Hz. Alternatively, the instrument 10 may also produce a command to flash the symbol 26. If the parameter number corresponds to engine speed, the RPM symbol is displayed to the right of the digital display 28.

If the currently displayed parameter number corresponds to vehicle speed, the instrument reads an English/metric programming input (not shown) to determine whether the MPH or km/h symbol is to be illuminated to the right of the digital display 28. Advantageously, the instrument 10 illuminates the MPH symbol in response to the English/metric input being in an open or floating voltage condition, and illuminates the km/h symbol in response to the English/metric input being grounded.

Industrial Applicability

The operation of an embodiment of the present invention is best described in relation to its use in displaying a plurality of parameter levels and operating conditions on a vehicle. The instrument 10 is operable in a number of modes including the normal display mode, the service mode, the status mode, the tattletale mode, and the numeric readout mode. The instrument 10 automatically enters the normal display mode of operation when power is applied. To access other display modes, the service and clear inputs 50,52 are grounded simultaneously. When both inputs 50,52 are grounded, a mode number corresponding to the current operating mode appears on the digital display 28. Preferably, the five operating modes are numbered from 0 through 4. If the service and clear inputs 50,52 both remain grounded for advantageously 2 seconds, the instrument 10 begins scrolling through the modes. When the desired mode is reached, i.e. the mode number corresponding to the desired operating mode is displayed on the digital display 28, the technician locks on to that mode by disconnecting the service and clear inputs 50,52 from ground.

While operating in the normal display mode, the instrument 10 assigns each of the sensed parameters to a gauge 12 in response to the identification code. The gauges 12 each include indicating segments forming the middle portion of the gauge with two warning segments at both the top and bottom of the gauge. For each gauge, the high warning segments are enabled if the instrument 10 assigns a parameter to that gauge 12 for which it is desirable to indicate a warning condition when the parameter exceeds a certain level; whereas the low warning segments are enabled if the instrument 10 assigns a parameter for which it is desirable to indicate a warning condition when the parameter is below a certain level.

When a gauge 12 is to be used to indicate a parameter level, the central outline segments 23, one of the high or low outline segments 22,24, and the appropriate ISO symbol 26 are illuminated. If a gauge is not being used on a particular machine, the symbol 26 and outline segments 22,23,24 are not illuminated. Since the optical filter only allows the VF displays to be substantially visible when the segments are illuminated by the instrument 10, the gauge segments 22,23, 24 and symbols 26 are not visible when not being used to indicate a parameter level.

The instrument 10 is programmed so that a normal operating level for each gauge on a given vehicle is close to the center of the gauge. For this reason the scaling for each gauge is both parameter and vehicle dependent and is established by the instrument in response to the identification code.

On some vehicles where turn signals are unnecessary or the function is performed by devices outside the instrument 10, the turn signal indicators 32 are disabled. Similarly, the high-beam indicator 34 and retarder indicator 36 are disabled if unnecessary for use in connection with a given vehicle. As is the case with the gauges, the turn signal indicators 32, retarder indicator 36, and high beam indicator 34 are not substantially visible unless illuminated.

In addition, the appearance of the gauges 12 may be changed by changing the status of the display mode select means 41. In the fill-the-graph mode, the parameter level is reflected by the number of gauge segments that are turned on. In this mode, the gauge appears like a bar graph. In the single-bar mode, the gauge appears more like a mechanical gauge with only one segment at a time being turned on.

While in the service mode, the pin numbers corresponding to the diagnosable sensor signals having a present or previous fault condition are scrolled on the full scale units for the speedo/tacho gauge 13. Fault codes are also scrolled on the one-half-of-full-scale units for the speedo/tacho gauge, the gear display, and the digital display. One of the sensor signals having a present or previous fault condition is "locked on" through activation of the service input 50. The SERV CODE indicator 33 is illuminated when the "locked on" input is presently in a fault condition. When the instrument 10 is "locked on" a particular diagnostic code, the technician views the SERV CODE indicator 33 while manipulating the wire harness or disturbing a connector or plugging/unplugging a sensor to help determine the location or cause of an intermittent problem.

Each of the pin numbers associated with a changed state on one of the instrument 10 terminals is also displayed. To aid troubleshooting by one technician, the warning horn 17 supplements the SERV CODE indicator 33 by producing an audible signal each time the SERV CODE indicator 33 changes state.

When in the status mode, the indicator lights 14 are used diagnostically to indicate the status of various inputs. In response to being assigned to a group of switch-type inputs through activation of the clear input 52, each indicator light 14 assigned to a switch-type input being in a fault, i.e. open voltage, condition is flashed. The pin number of each switch-type input in a fault condition is individually displayed by the instrument. Each time a pin number corresponding to one of the flashing indicator lights 14 is displayed, that indicator light 14 is steadily illuminated rather than flashed.

The pin number of each switch-type input having changed states is also displayed. The warning horn 17 augments the usefulness of the indicator lights 14 by sounding briefly each time any of the switch-type inputs changes states. The augmentation allows the technician to determine when a switch-type input has changed state even when working remotely from the instrument 10. The pin numbers of switch-type inputs having changed status are also displayed to provide the technician with a visual indication of which inputs have changed state.

While in the tattletale mode, all gauges and readouts are displayed in the most extreme readings since the previous time the tattletale mode was cleared. Low warning style gauges display the minimum readings. High warning style gauges display the maximum readings. The speedo/tacho gauge 13 displays the maximum reading. Also, any indicator light 14 that was activated since the previous time the tattletale mode was cleared is activated.

The numeric readout mode is included to digitally display the magnitude of sensed parameters. In the preferred embodiment, a number is displayed on the digital display 28 indicating the level of the sensed parameter in engineering units. Alternatively, the sensor signal is displayed as a percent of the full scale reading of the parameter sensor 11.

Once the numeric readout mode is entered, the parameters are scrolled by grounding the service input 50 until the desired parameter number is displayed by the gear display 30. The technician disconnects the service input 50 from ground potential to "lock onto" the displayed parameter number. The level of the selected parameter is displayed in digital form on the digital display 28 either in engineering units or as a percentage of the full scale sensor reading. If the selected parameter corresponds to one of the parameters displayed on gauges 1 through 6, the outline segment for that gauge is flashed. Each of the symbols 26 identifying the parameters being displayed on the gauges 12 is also illuminated. If either engine speed or vehicle speed is selected, the appropriate unit identifier is illuminated to the right of the digital display 28.

By using the numeric readout mode, the technician can precisely determine the parameter level and/or effectively troubleshoot sensors suspected of producing erroneous signals. If, for example, it is desired to know the engine oil pressure at a specific engine speed, it can be displayed directly in kPa by way of the numeric readout mode. As another example, assume that there is a suspicion about the accuracy of the transmission temperature sensor. In the numeric readout mode the temperature can be displayed in degrees Celsius for comparison with a certified temperature measurement.

Any specific values used in the above descriptions should be viewed as exemplary only and not as limitations. Other aspects, objects, and advantages of this invention can be obtained from a study of the drawings, the disclosure, and the appended claims.

We claim:

1. An apparatus for indicating levels of sensed parameters related to machine operation, warning conditions, and fault conditions on any of a plurality of machines having an instrument panel and a plurality of switch-type inputs and diagnostic inputs, said instrument panel operating in one of a plurality of modes including a normal display mode, a service mode, a status mode, and a numeric readout mode, comprising:

means for producing an identification code, each of the plurality of machines having a unique identification code for identifying the machine to which the apparatus is connected;

a plurality of diagnostic sensor means for sensing a plurality of parameter levels and responsively producing a plurality of diagnostic sensor signals;

a plurality of gauge means for indicating a level of the sensed parameters;

a plurality of symbol means for identifying the sensed parameter being indicated on each of said gauge means, said plurality of gauge and symbol means being substantially visible to an operator only when illuminated;

means for selecting the normal display mode;

means for selecting the numeric readout mode;

control means for receiving said identification code and selectively illuminating one or more of said plurality of gauge and symbol means in response to said identification code and the instrument panel being in the normal display mode or the numeric readout mode;

a plurality of warning lights, each of said warning lights being associated with one of the switch-type inputs;

means for selecting the status mode;

display means for selectively indicating a pin code for each switch-type input having a fault condition;

means for flashing each of said warning lights having an associated switch-type input in the fault condition in response to the instrument panel being in the status mode;

means for selecting the service mode;

means for indicating a pin code in response to each of the diagnostic inputs having a present or a previous fault condition in response to the instrument panel being in the service mode;

a digital display;

means for selecting one of said plurality of diagnostic sensor signals corresponding to the one or more of said plurality of gauge and symbol means illuminated in response to said identification code; and means for displaying the selected sensor signal in digital form on said digital display in response to the instrument panel being in the numeric readout mode.

2. A method for indicating levels of sensed parameters related to machine operation, warning conditions, and fault conditions on any of a plurality of machines having an instrument panel and a plurality of switch-type inputs and diagnostic inputs, the instrument panel including a plurality of indicating lights and a plurality of gauges and symbols, comprising the steps of:

producing an identification code, each of the plurality of machines having a unique identification code for identifying the machine to which the apparatus is connected;

selecting one of a normal display mode, a status mode, a service mode, or a numeric display mode;

sensing parameters and responsively producing sensor signals indicating one of a fault condition and a normal condition;

receiving the identification code, assigning one of the sensor signals to each of the illuminated gauges in response to the identification code and the selection of either the normal display mode or the numeric display mode, and selectively illuminating one or more of a plurality of gauges and symbols, each symbol identifying the sensed parameter indicated on the illuminated gauges;

indicating a level of the sensed parameters on the illuminated gauges;

selectively indicating a pin code for each switch-type input having a warning condition in response to selection of the status mode;

flashing each indicator light having an associated switch-type input in a fault condition in response to selection of the status mode;

indicating a pin code in response to each of the diagnostic inputs having a present or a previous fault condition in response to selection of the service mode;

selecting one of said sensor signals assigned to the gauges being illuminated in response to the identification code; and displaying the level of the selected sensor signal in digital form on a digital display in response to selecting the numeric readout mode.

* * * * *